(12) United States Patent
Hurwitz et al.

(10) Patent No.: US 8,360,478 B2
(45) Date of Patent: Jan. 29, 2013

(54) SACRIFICIAL HOSE FITTING ASSEMBLY

(75) Inventors: Scott L. Hurwitz, Rochester, NY (US);
Chad S. Conklin, Walworth, NY (US);
Mark L. Frisicano, Rochester, NY (US)

(73) Assignee: Magnum Shielding Corporation, Pittsford, NY (US)

( * ) Notice: Subject to any disclaimer, the term of this patent is extended or adjusted under 35 U.S.C. 154(b) by 184 days.

(21) Appl. No.: 12/715,790

(22) Filed: Mar. 2, 2010

(65) Prior Publication Data
US 2011/0215567 A1 Sep. 8, 2011

(51) Int. Cl.
*F16L 33/00* (2006.01)
(52) U.S. Cl. ............ 285/247; 285/222.4; 285/249; 285/251; 285/385
(58) Field of Classification Search ............ 285/247, 285/30, 89, 248, 249, 384, 385, 222.4, 251
See application file for complete search history.

(56) References Cited

U.S. PATENT DOCUMENTS

| | | | |
|---|---|---|---|
| 36,410 A | 9/1862 | Jucket | |
| 2,328,013 A | 12/1941 | Hattan | |
| 2,423,632 A | 10/1943 | Ansorge | |
| 2,552,077 A | 12/1947 | Williams et al. | |
| 2,877,027 A * | 3/1959 | Bagnell | 285/113 |
| 2,935,339 A | 5/1960 | Frederick | |
| 3,117,808 A | 1/1964 | Swick et al. | |
| 3,140,106 A | 7/1964 | Thomas et al. | |
| 3,606,396 A | 9/1971 | Prosdocimo et al. | |
| 3,659,880 A | 5/1972 | Goldsobel | |
| 3,870,349 A | 3/1975 | Oetiker | |
| 3,980,325 A | 9/1976 | Robertson | |
| 4,498,691 A * | 2/1985 | Cooke | 285/12 |
| 4,666,190 A | 5/1987 | Yamabe et al. | |
| 4,805,942 A | 2/1989 | Goodridge | |
| 5,558,375 A | 9/1996 | Newman | |
| 6,568,718 B1 | 5/2003 | Allegri | |
| 6,626,469 B2 | 9/2003 | Favre et al. | |
| 6,860,522 B1 | 3/2005 | Spiegler | |

(Continued)

FOREIGN PATENT DOCUMENTS

| CN | 201062697 Y | 5/2008 |
|---|---|---|
| JP | 2003113979 A | 4/2003 |

(Continued)

*Primary Examiner* — Michael P Ferguson
*Assistant Examiner* — Jay R Ripley
(74) *Attorney, Agent, or Firm* — Brian B. Shaw, Esq.; Stephen B. Salai, Esq.; Harter Secrest & Emery LLP

(57) ABSTRACT

A hose fitting assembly is provided, wherein the components are operably engaged with a length of hose to form a sacrificial construction. An end fitting having an insertion stem is disposed within a portion of the hose, wherein a clamping sleeve receiving a length of the hose threadingly engages the end fitting. A swaging collar is slide along the hose to threadingly engage the clamping sleeve, such that complete threaded engagement of the swaging collar and the clamping sleeve circumferentially compress and deform a portion of the clamping sleeve to clamp a portion of the hose intermediate the clamping sleeve and the insertion stem, and partially deformed threads on at least one of the clamping sleeve and the swaging collar. The hose fitting assembly can cooperatively engage a flexible high pressure metal braided hose, wherein the metal braid is formed of a less than full tensile strength steel, such as half hard stainless steel.

8 Claims, 14 Drawing Sheets

U.S. PATENT DOCUMENTS

Figure 1:
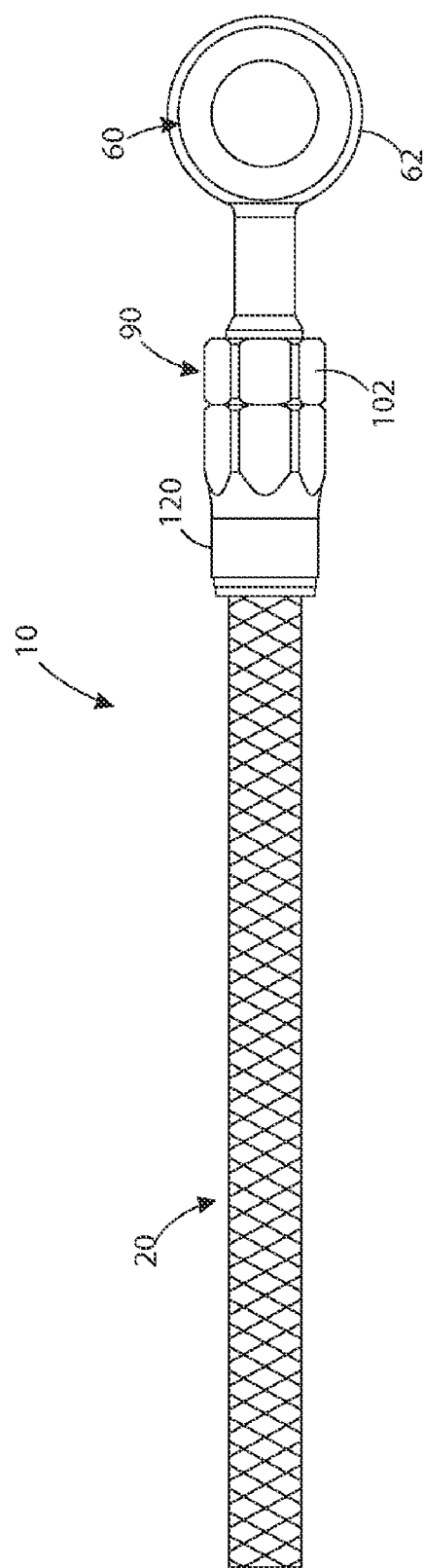

| | | |
|---|---|---|
| 7,341,284 B2 | 3/2008 | Mittersteiner et al. |
| 7,347,457 B2 | 3/2008 | Wulf et al. |
| 7,455,328 B2 | 11/2008 | Chelchowski et al. |
| 7,484,772 B2 | 2/2009 | Thorensen |
| 7,498,509 B2 | 3/2009 | Brotzell et al. |
| 2006/0108798 A1 | 5/2006 | Goodridge |
| 2006/0151043 A1* | 7/2006 | Nanney et al. ............ 138/125 |
| 2008/0185839 A1 | 8/2008 | Mittersteiner et al. |
| 2008/0272590 A1 | 11/2008 | Howard et al. |

FOREIGN PATENT DOCUMENTS

JP 2005147381 A 6/2005

* cited by examiner

SACRIFICIAL HOSE FITTING ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING"

Not applicable.

BACKGROUND OF THE INVENTION

1. Field of the Invention

The present invention relates to hose fitting assemblies and more particularly to a sacrificial hose fitting assembly, wherein the assembly can be configured to meet predetermined strength pressure and stress requirements in combination with a flexible high pressure hose.

2. Description of Related Art

Many flexible conduits, hoses, cords, wires, and the like are adapted to be connected to stationary objects. A common problem encountered by each of these connections is that the flexing of the conduits, hoses, etc. follows a repeating pattern which tends to concentrate material fatigue in such a manner that the conduit, hose, cord, wire, etc., may break and an early failure may occur. For example, electrical cords for such things as irons, toasters and the like have coiled springs or molded rubber sleeves around them at and in the vicinity of a plug. However, these kinds of devices are quite unsophisticated and do little more than to cause the cord to bend around a larger radius, perhaps with some random differences in the individual bending episodes. Conduits, hoses and the like present other problems since it is not only necessary to protect against fatigue, but it is also necessary to protect against kinking, crimping, sudden pulse-like increase or decrease of internal pressure, and the like. For extremely hostile flexing environments such as road hazards, aircraft, brake lines, etc., the unsophisticated stress relief devices may add relatively little service life.

In some specialized devices, there are even more severe tests to be met. For example, a fuel line hose for an aircraft has a need for a similar kind of stress relief. However, in an aircraft the weight requirements are such that for every pound of added weight, the weight of the supporting structure, power plant, etc. must be multiplied many times. Thus, if a pound of stress relief must be added to the fuel line hose, perhaps as much as 5 to 10 pounds must be added to the weight of the wing spars, landing gear, engine, and the like. In addition, the increased weight adds cost for fuel and a reduction in the operating range of the aircraft on every flight.

A stress relief device should be adaptable to an incorporation into an assembly of the hose and end fitting without a substantial amount of specialized construction. The stress relief should extend over as much of, but no more than, the length of a hose as may be required. A less than adequate amount of protection would be insufficient. More than an adequate amount would lead to excess weight and cost, as well as possible failure.

Some previous stress relievers are designed to protect against a static bending situation, such as with a gasoline pump hose, which may be stretched to its limit and then held in a static position. Under such conditions, a device need not be sophisticated or even optimized because the physical abuse which it must endure is not very great. However, there is a need for hose couplings that can endure a high-cycle, high frequency or continuous, rotary or reversing linear dynamic flexing of the hose, thus withstanding tremendous amounts of fatigue and hysteresis loss.

In addition to stress relief, it is desirable to provide a number of secondary advantages. Exemplary of such advantages are strain relief and abrasion resistance. (Stress relief relates to bending; strain relief relates to pulling.) These advantages are especially important in places where the hose might experience excessive mechanical wear.

Current DOT compliant brake line assemblies for braided metal high-pressure hoses include a strain relief device incorporated into a crimp joint fitting either through a bell deformation of such fitting or a plastic or metal extension to achieve a strain relief effect protecting the high tensile stainless steel wires of the braiding from reaching fatigue levels thereby preventing the rupturing of the inner tubing during the duration of mandated testing.

Therefore, the need exists for a hose fitting assembly and high pressure flexible metal braided hose that can meet DOT regulations, while providing for end user assembly without requiring specialized swaging equipment or additional components extending along the hose.

BRIEF SUMMARY OF THE INVENTION

For convenience of description, the following disclosure refers specifically to an automobile brake line of a relatively small diameter with an end fitting which must pass certain Department of Transportation tests, including FMVSS 106", wherein such hoses have been previously described as a "kinetic hose" which can withstand large displacement vibrations occurring at a high frequency. However, it should be understood that the disclosure also applies to many other applications. Thus, a reference to a brake line is not to be construed as necessarily limiting the application or scope of the present disclosure. Further, although the disclosed sizing is a −3 hose, it is understood the present assembly can be employed with a −2 or −4 size hose, as well as other sizes.

In an exemplary embodiment of the present disclosure, a hose fitting assembly is provided, wherein the hose fitting can cooperatively engage a length of flexible high pressure hose to form a sacrificial end fitting assembly. In selected configurations, the hose fitting assembly and the hose can be formed to meet selected US government regulations relating to brake lines.

In addition, the present hose fitting assembly provides for operable formation of a sacrificial assembly with less than 15 ft-lbs torque, and in selected configurations less than 10 ft-lbs torque, and in certain configurations of the components less than 6. ft-lbs torque.

The hose fitting assembly can cooperatively engage a flexible high pressure metal braided hose, wherein the metal braid is formed of a less than full tensile strength steel, such as half hard stainless steel, with a braid configuration sufficient to comply with predetermined tests.

In one construction, the hose fitting assembly includes an end fitting having an insertion stem extending along a longitudinal dimension, wherein a length of the insertion stem is sized to be disposed within the hose. The end fitting has a through bore and external trapping threads extending along a fixed length of the longitudinal dimension. The end fitting further includes an external stop spaced from the external trapping threads by a capturing gap. This construction of the hose fitting assembly further includes a clamping sleeve having a leading end, a trailing end and a central passageway extending from the leading end to the trailing end. The central passageway is sized to receive a length of the hose at the leading end and defines a hose stop and internal trapped threads extending along a given length of the longitudinal dimension. At the trailing end, the central passageway is sized to receive a portion of the end fitting. The clamping sleeve also includes external compression threads extending along a predetermined length of the longitudinal dimension, an external fitting stop and a circumferentially compressible section, wherein the external compression threads are spaced from the external fitting stop by a free distance. This configuration of the hose fitting assembly further includes a swaging collar having a lead end, a trail end and a central passage extending between the lead end and the trail end. The central passage of the swaging collar has internal compressive threads sized to engage the external compression threads. A taper and a clamping section are formed in the central passage, wherein the central passage is sized to receive a portion of the clamping sleeve. The internal compressive threads are sized to extend along a set length of the longitudinal dimension and are spaced from the taper by a non-engaging gap, wherein the non-engaging gap is less than the predetermined length and the free distance is less than the set length.

It is further contemplated the hose fitting assembly can include means for precluding non-destructive separation of the clamping sleeve and the swaging collar, wherein the means includes a deformation of one of the clamping sleeve and the swaging collar in response to an operable threaded engagement of the clamping sleeve and the swaging collar which requires less than 10 ft-lbs of torque.

The hose fitting assembly coupled to the hose can provide performance characteristics of a burst strength of at least 5,000 psi and a tensile strength of at least 325 lbs.

The present disclosure provides a method of affixing an end fitting to a flexible high-pressure hydraulic hose having a terminal end, by disposing the terminal end of the flexible hose within a clamping sleeve to contact a hose stop; threading external trapping threads of an end fitting past internal trapped threads of the clamping sleeve to locate the internal trapped threads of the clamping sleeve intermediate the external trapping threads and an external stop of the end fitting; and engaging internal compressive threads of a swaging collar with external compression threads of the clamping sleeve to compress a portion of the hose between the clamping sleeve and the end fitting to form a high-pressure hose assembly.

The method further includes precluding non-destructive separation of the swaging collar and the clamping sleeve, while requiring less than 10 ft-lbs of torque to operably and deformably engage clamping sleeve and the swaging collar.

These and other configurations are more fully set forth in the detailed description and the drawings.

BRIEF DESCRIPTION OF THE SEVERAL VIEWS OF THE DRAWING(S)

Figure 2:
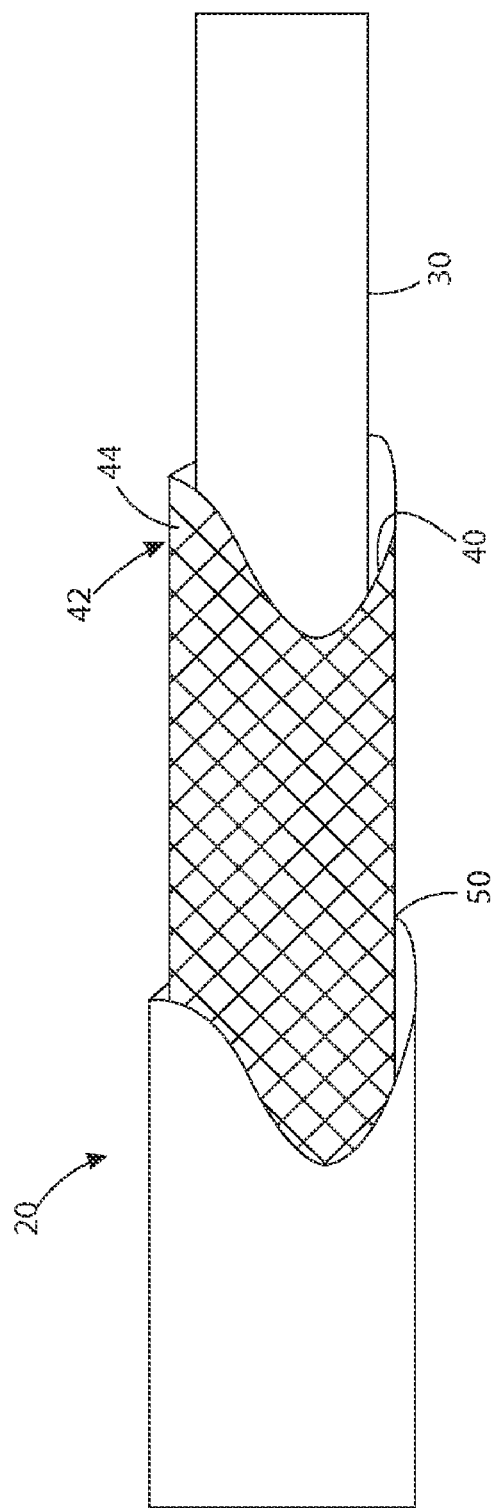
Figure 3:
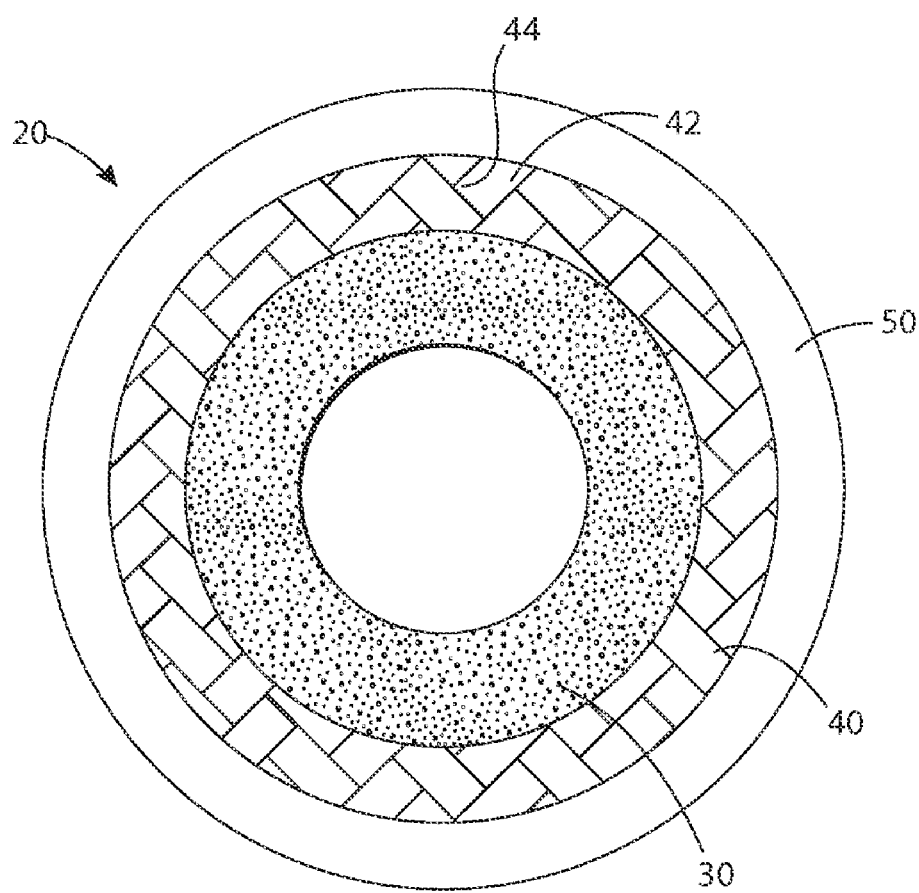
Figure 4:
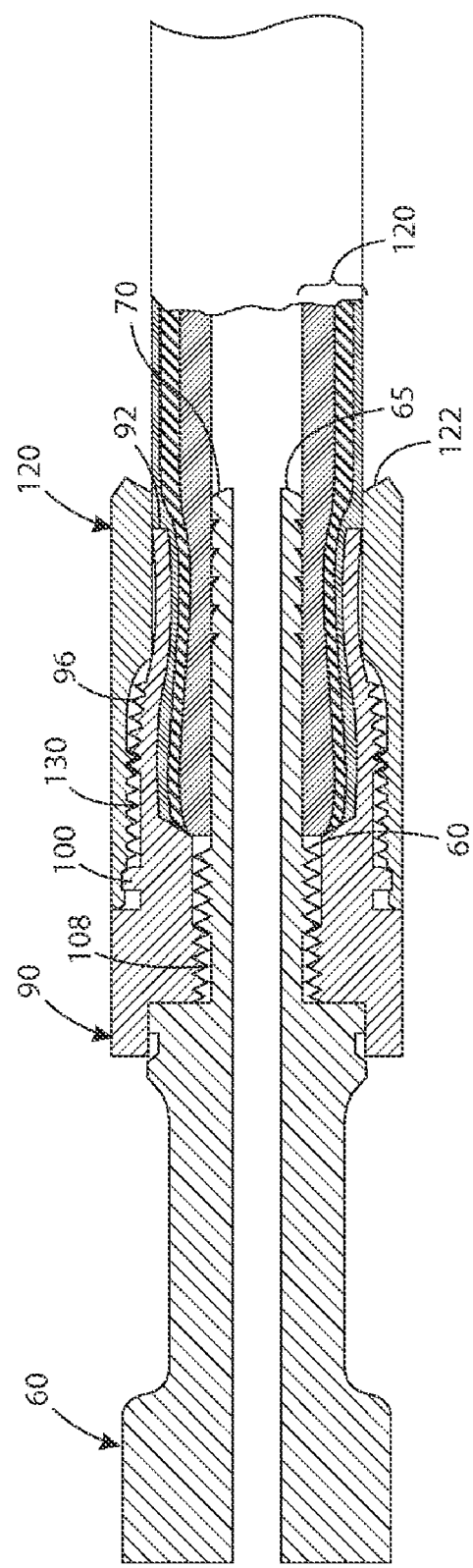
Figure 5:
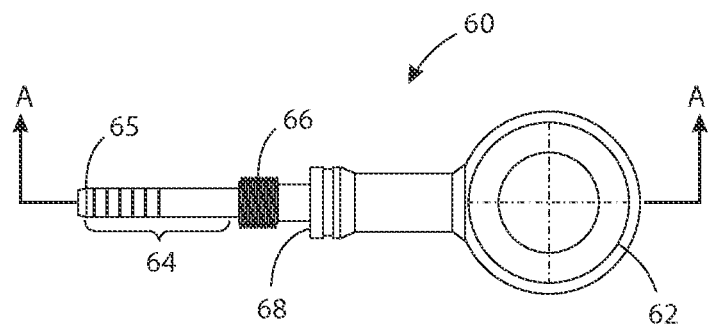
Figure 6:
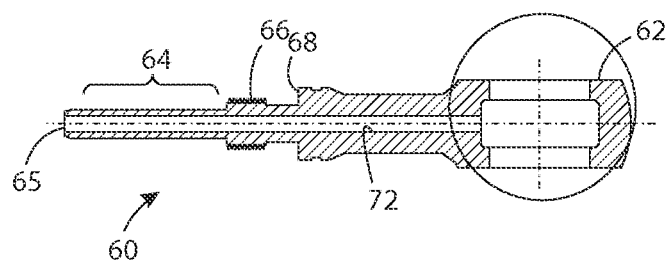
Figure 7:
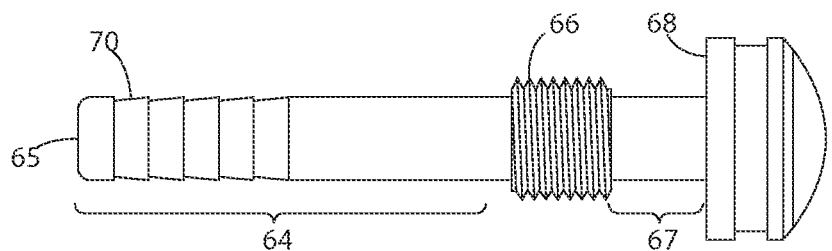
Figure 8:
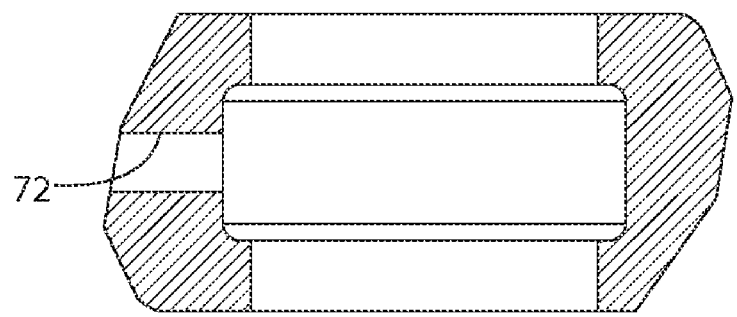
Figure 9:
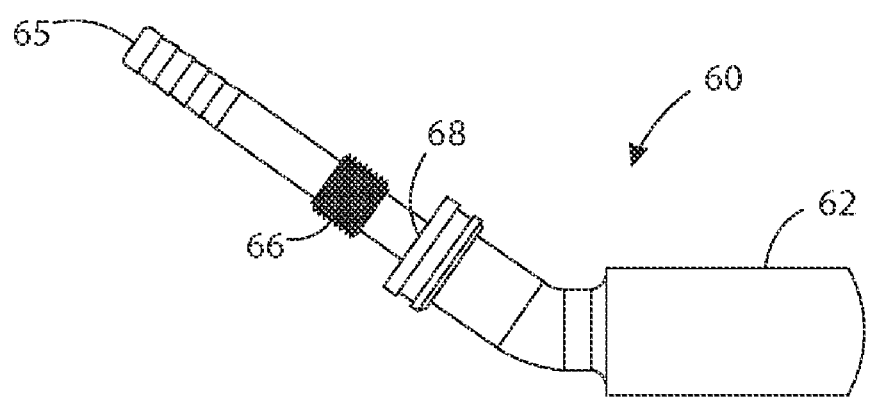
Figure 10:
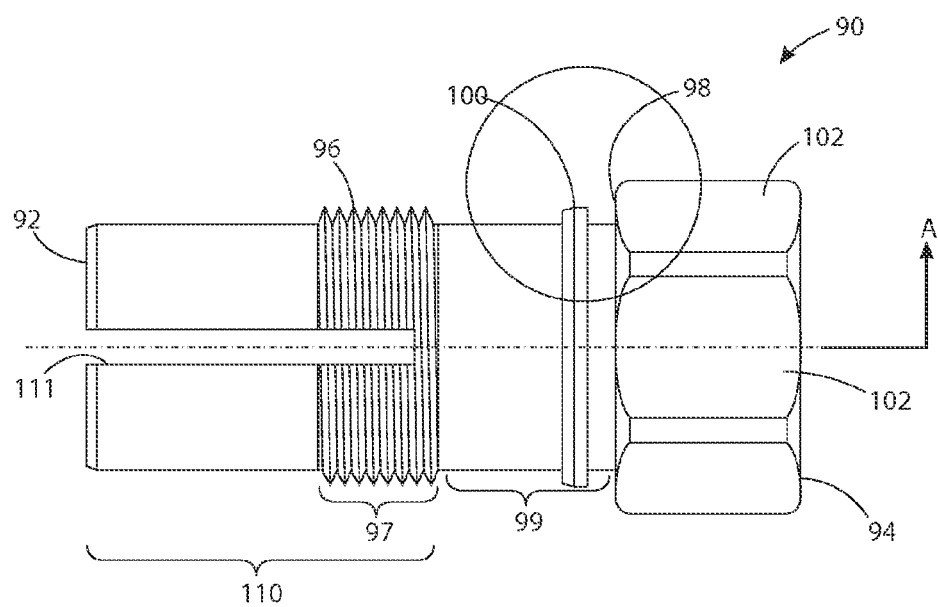
Figure 11:
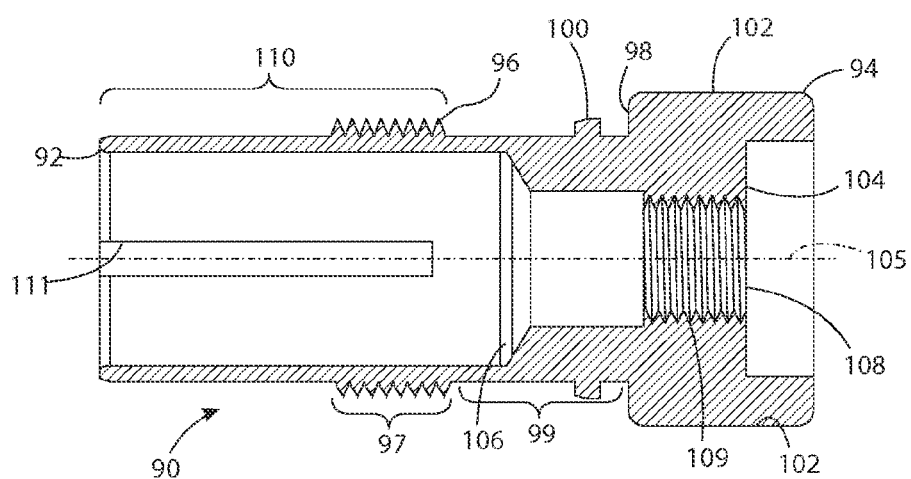
Figure 12:
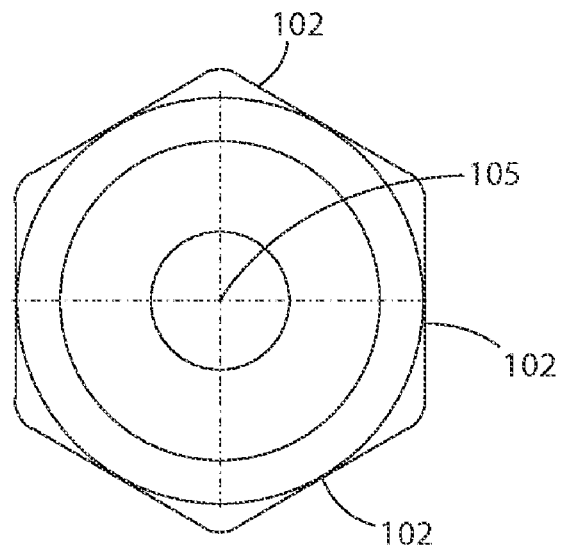
Figure 13:
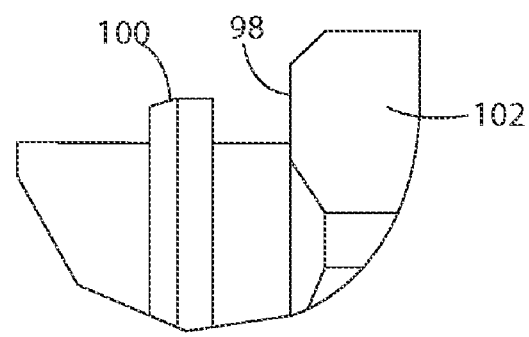
Figure 14:
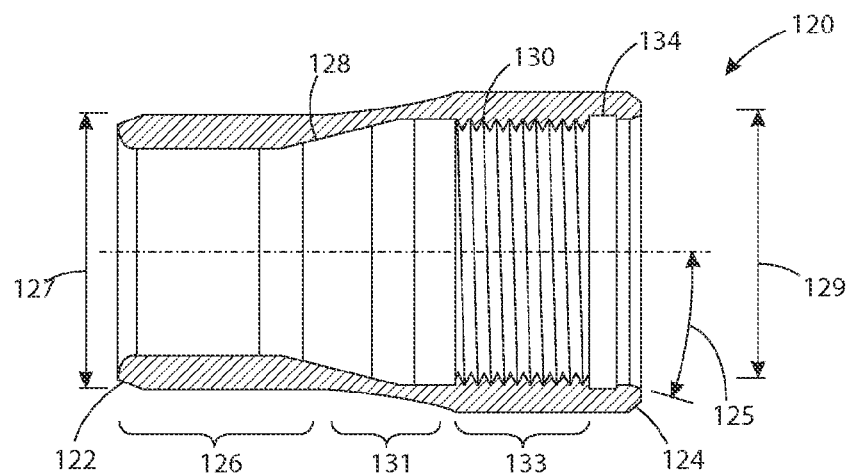
Figure 15:
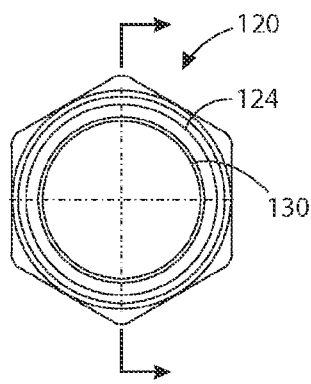
Figure 16:
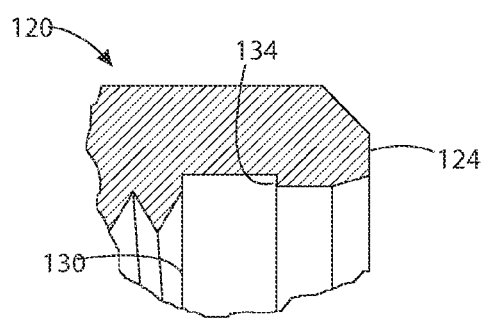
Figure 17:
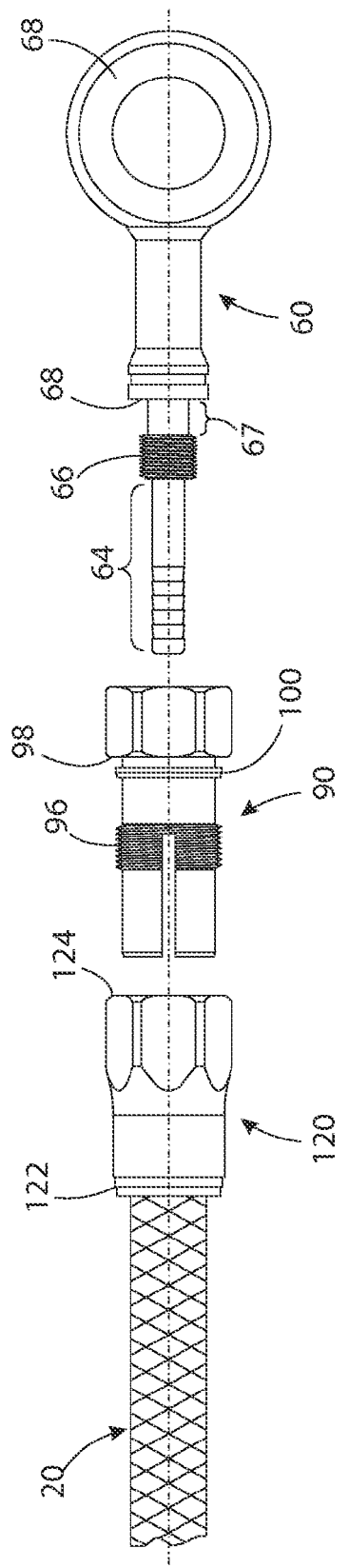
Figure 18A:
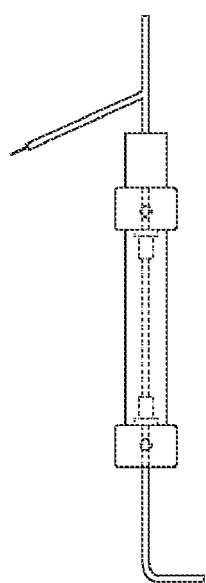
Figure 18B:
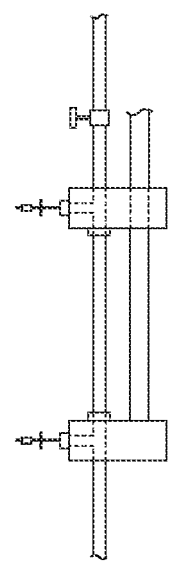
Figure 19:
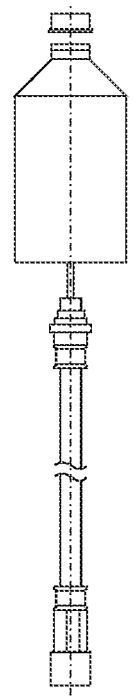
Figure 20:
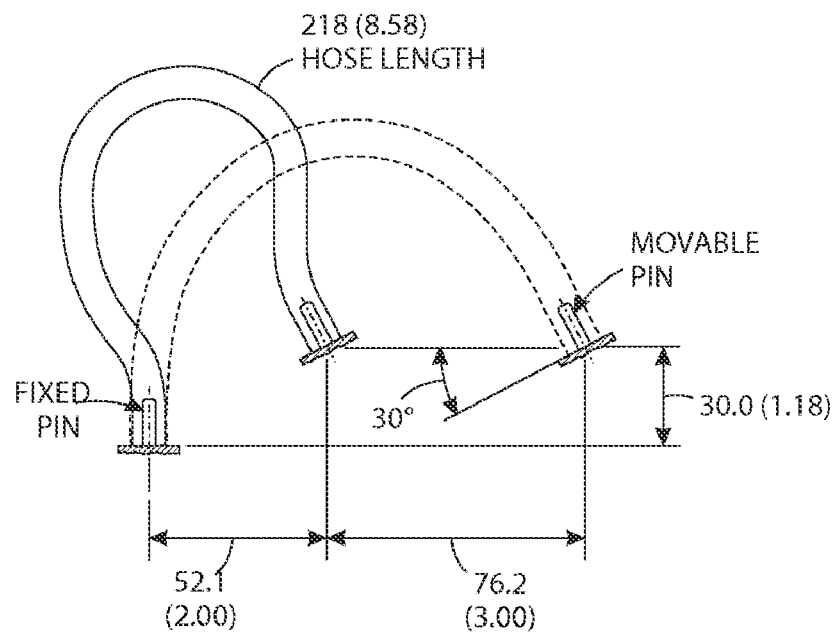
Figure 21:
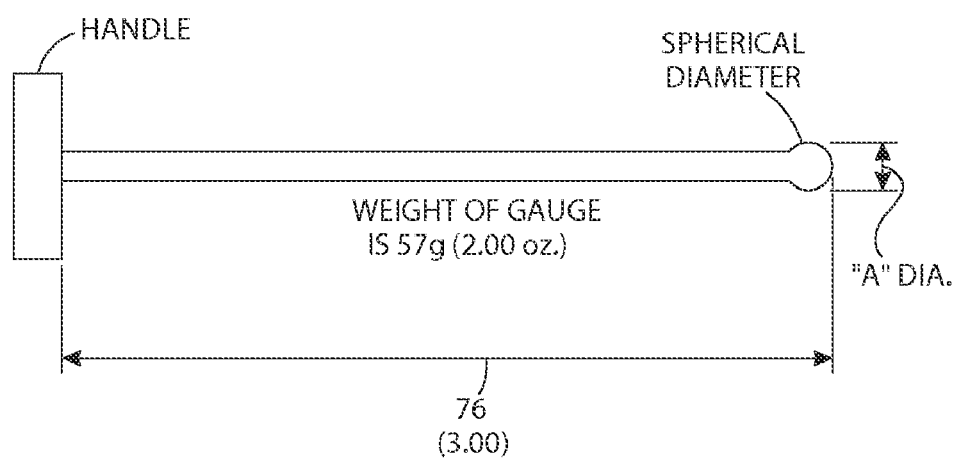
Figure 22A:
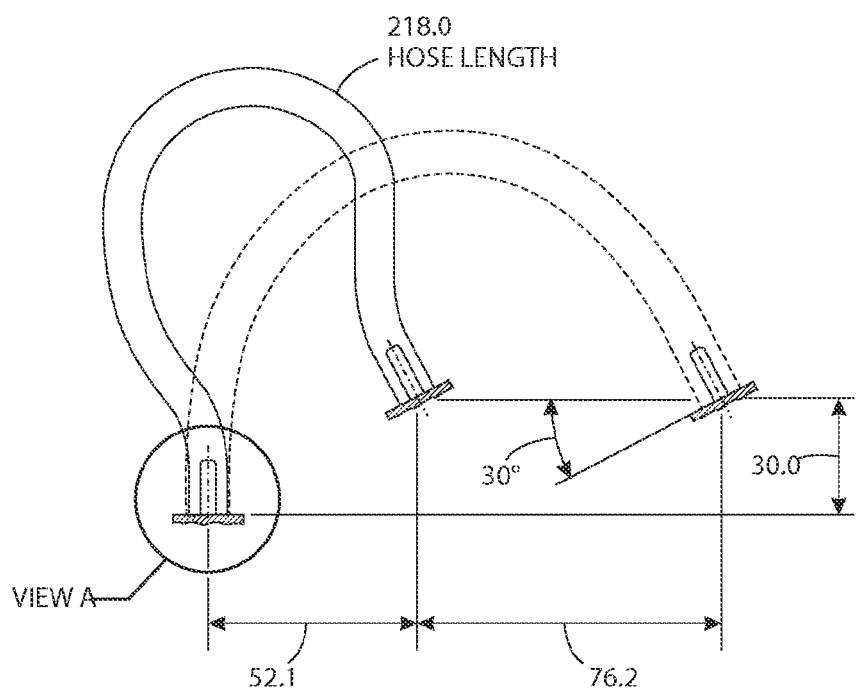
Figure 22B:
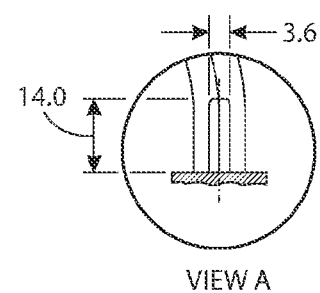
Figure 23:
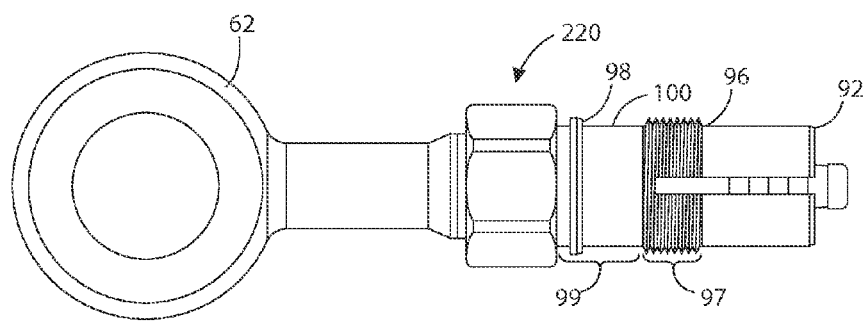
Figure 24:
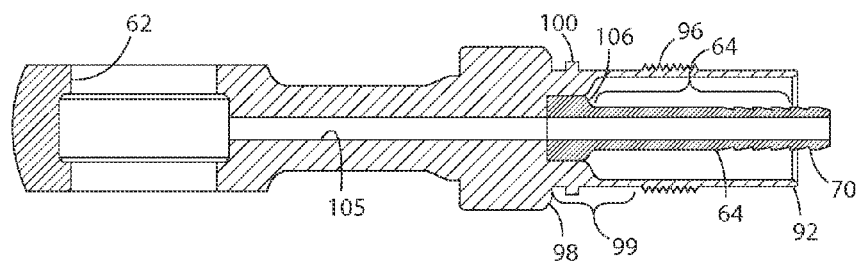

FIG. 1 is a hose fitting assembly is cooperatively connected to a hose.
FIG. 2 is a partial cut away view of a length of the hose.
FIG. 3 is an end view of the hose.
FIG. 4 is a partial cut away showing a hose fitting assembly operably engaged with a length of high pressure hose.
FIG. 5 is a top plan view of a first configuration of an end fitting.
FIG. 6 is a cross sectional view taken along lines 5-5 of FIG. 5.
FIG. 7 is an enlarged top plan view of a portion of the end fitting.
FIG. 8 is an enlarged cross sectional view of a coupling interface of the end fitting of FIG. 5.
FIG. 9 is a side elevational view of an alternative end fitting.
FIG. 10 is a side elevational view of the clamping sleeve.
FIG. 11 is a cross sectional view taken along lines 11-11 of FIG. 10.
FIG. 12 is an end view of the trailing end of the clamping sleeve.
FIG. 13 is an enlarged view of a portion of FIG. 10 showing the locking flange.
FIG. 14 is a cross sectional view of the swaging collar.
FIG. 15 is an end view of the swaging collar from the trail end.
FIG. 16 is an enlarged view of a portion of the swaging collar showing the locking ring.
FIG. 17 is a perspective view of the swaging collar, the clamping sleeve, the end fitting and the hose prior to operably connection of the swaging collar, the clamping sleeve and the end fitting.
FIG. 18 is a representative test apparatus for the recited expansion test.
FIG. 18A is an alternative view of the representative test apparatus for the recited expansion test.
FIG. 19 is a representative test apparatus for the recited brake fluid compatibility test.
FIG. 20 is a representative test apparatus for the recited dynamic ozone test.
FIG. 21 is a representative test apparatus for the recited constriction test.
FIG. 22 is a representative test apparatus for the dynamic ozone test as set forth in the recited SAE J1401.
FIG. 22A is an alternative view of the representative test apparatus for the dynamic ozone test as set forth in the recited SAEJ1401.
FIG. 23 is a top plan view of an alternative configuration of the hose fitting assembly.
FIG. 24 is a cross sectional view of the hose fitting assembly of FIG. 23.

DETAILED DESCRIPTION OF THE INVENTION

As seen in FIG. 1, a hose fitting assembly 10 is cooperatively connected to a hose 20, such as a high pressure hose to form a sacrificial assembly, wherein the assembly can be selected to meet various safety standards.

Referring to FIG. 2, a perspective of a length of the hose 20 is shown. The hose includes an inner tubing 30, a metal braid 40 about the inner tubing and an outer jacket 50 about the metal braid.

The inner tubing 30 is selected to be resistant to the anticipated fluid passing through the hose 20. In addition, the inner tubing 30 is sized to meet predetermined pressure resistance. In one configuration, the inner tubing 30 is a polymeric material such as, but not limited to fluoropolymer, nylon and particularly a nylon 12, such as a plasticized industrial grade Polyamide 12 having a hardness between approximately 60D and 70D on the shore scale and a density of approximately 1.03 g/cc, such as from UBE Industries Ltd. In one construction, the inner tubing 30 has an inner diameter of approximately 0.138 inches, with a wall thickness of approximately 0.051 inches and a burst strength of at least 300 psi.

The metal braid 40 is formed about the inner tubing 30 as known in the art. However, the parameters of the metal braid 40 have been found critical in providing a satisfactory hose. The metal braid 40 includes a plurality of wire bundles 42 braided about the inner tubing 30, wherein the wire bundles have a selected number of strands (plys) 44 per bundle, the strands are within a selected diameter range, with a number of picks per inch of the braid within a selected range and the material of the strands has a selected tensile strength.

A satisfactory braid 40 includes approximately 24 bundles 42, wherein each bundle includes between 3 and 6 strands (plys) 44. However, it is understood the braid 40 can include between 16 bundles and 32 bundles. In one configuration, the braid 40 is a 24 carrier construction with 4 ends per bobbin.

The braid 40 is formed to have between approximately 20 to 30 picks per inch, with a satisfactory number of picks per inch to be between approximately 18-27 picks per inch, with a working number of 25.5 picks per inch. This provides the resulting braid 40, given the diameter of the wire strands, with a braid angle of approximately 35-40°. The resulting braid provides between approximately 80% to 95% coverage of the inner tubing 30. In a satisfactory configuration of the metal braid 40, the metal braid provides a coverage between approximately 85% to 90%, with a satisfactory coverage of approximately 88%. The coverage is defined as the percentage of the outside surface of the inner tubing 30 that is covered by the metal braid.

The material of the metal braid 40 is selected to enhance the strength characteristics of the resulting assembly. Specifically, in contrast to prior systems employing high strength, high tensile steel or metal, the present hose 20 employs less than a full tensile strength stainless steel, such as, but not limited to a half hard stainless steel in the braid 40. That is, the metal, such as stainless steel, has a tensile strength between approximately 140-240 ksi (thousand of pounds per square inch), with a satisfactory tensile strength of between approximately 170-200 ksi, and a more satisfactory tensile strength between approximately 180-190 ksi.

An available material having less than full tensile strength stainless steel is 304L half hard, stainless steel. The diameter of the wire is between approximately 0.004 inches and 0.01 inches, with satisfactory diameter between approximately 0.006 inches (0.15 mm) and 0.008 inches. The resulting diameter of the inner tubing with the metal braid is approximately 0.265 inches±0.009 inches.

In one configuration, the outer jacket 50 is an extruded coating about the braided inner tubing. The outer jacket 50 is a polymeric material capable of meeting the applicable standards. As seen in FIG. 3, in contrast to some prior constructions, the present outer jacket 50 is applied as a deep extrusion so the polymeric material is at least partially intermediate the metal braid 40 and the inner tubing 30, as well as partially between the bundles 42 of the braid 40. That is, the polymeric material at least partially surrounds the bundles, but does not typically surround individual strands within a given bundle.

It is believed the penetration of the outer jacket 50 into and around the metal braid 40 acts to reduce wear of the braid as well as provide thermal control during repeated flexing, thereby increasing the working life of the hose 20. A satisfactory polymeric material is high grade polyvinyl chloride (PVC), with light stabilization sold by DuPont, Ciba Specialty Chemicals Corporation or BASF, wherein the additive can be used in the 1% to 10% range, with an effective amount being approximately 5%.

The resulting hose 20 has an outer diameter of approximately 0.2955±0.002 inches.

As seen in FIG. 4, the hose fitting assembly 10 includes an end fitting 60, a clamping sleeve 90 and a swaging collar 120. In one configuration, the end fitting 60, the clamping sleeve 90 and the swaging collar 120 are cooperatively engaged to form a sacrificial assembly with a length of the hose 20, such that cooperatively engaging the components deforms a portion of the hose fitting assembly 10.

As seen in FIGS. 5, 6, 8 and 9, the end fitting 60 includes a coupling interface 62 for cooperatively engaging any of a variety of standard or custom couplings or connections such as, but not limited, to a banjo type hose fitting. The particular style or construction of the coupling interface 62 does not limit or restrict the present assembly.

Referring to FIG. 5, the end fitting also includes an insertion stem 64 extending along a longitudinal axis, wherein the insertion stem terminates at a free end 65. The end fitting 60 includes a plurality of external trapping threads 66. The end fitting 60 includes an external stop 68 spaced from the external trapping threads 66 by a distance along the longitudinal axis which distance defines a capturing gap 67 between the external trapping threads and the external stop. The insertion stem 64 includes a plurality of external barbs or ridges 70 longitudinally intermediate the external trapping threads 66 and the free end 65.

The end fitting 60 further includes a through bore 72 extending from the free end 65 of the insertion stem 64 to the coupling interface 62.

In one configuration, the end fitting 60 can be formed of any of a variety of materials, including but not limited to regular stainless steel, brass, 12L14 carbon steel or plated steel. It has been found advantageous that the plating of the steel not separate from the underlying steel during construction or use, and thus a zinc chromate plating can be used. A satisfactory material has been found to include 303 Cu stainless steel.

As shown in FIG. 10, the clamping sleeve 90 includes a leading end 92 and a trailing end 94 spaced along the longitudinal axis. External compression threads 96 are disposed intermediate the leading end 92 and the trailing end 94. The external compression threads 96 are sized to threadingly engage the swaging collar 120. The external compression threads 96 extend along the longitudinal axis to define predetermined length 97.

An external shoulder 98 is located intermediate the compression threads 96 and the trailing end 94. The external shoulder 98 is spaced from the compression threads 96 by a free distance 99 along the longitudinal dimension. The external shoulder 98 has a diameter, or dimension transverse to the longitudinal axis to preclude passage of the swaging collar 120. That is, a limit or threshold of the longitudinal movement of the clamping sleeve 90 relative to the swaging collar 120 can be set by the external shoulder 98.

The clamping sleeve 90 further includes a locking flange 100 intermediate the compression threads 96 and the external shoulder 98. That is, the locking flange 100 is disposed within the free distance 99. The locking flange 100 defines a diameter, or dimension transverse to the longitudinal axis, that is sized to be received within a corresponding portion of the swaging collar 120.

The clamping sleeve 90 includes a plurality of wrench flats 102 adjacent the trailing end 94. At the trailing end 94, the clamping sleeve 90 includes a seat 104 for receiving and contacting the external stop 68 of the end fitting 60.

As shown in FIG. 11, a central passageway 105 extends through the clamping sleeve 90 from the leading end 92 to the trailing end 94. A portion of the central passageway 105 is sized to receive a terminal end of the hose 20 and an adjacent length of the hose. The central passageway 105 defines a hose stop 106, wherein the hose stop has a reduced diameter sufficient to preclude passage of the hose 20. The central passageway 105 further includes internal trapped threads 108 intermediate the hose stop 106 and the trailing end 94. The internal trapped threads 108 are located and sized to engage the external trapping threads 66 of the end fitting 60. The internal trapped threads 108 extend along the longitudinal axis to define a given length 109.

As the central passageway 105 is sized to receive a length of the hose 20, the central passageway is also sized to receive the length of the insert stem 64.

The clamping sleeve 90 also includes a circumferentially compressible section 110, wherein the circumferentially compressible section extends along the longitudinal axis from the leading end 92 to terminate adjacent or proximal to the hose stop 106.

The circumferentially compressible section 110 includes at least one, and more preferably 2, 3 or 4 slits 111 extending from the leading end parallel to the longitudinal axis. The slits 111 have a length and width such that upon designed circumferential compression of the section 110, the section forms a substantially continuous compressed periphery, wherein the continuous compressed periphery engages the outside of the hose 20. In one configuration, the slits 111 extend from the leading end 94 to terminate proximal to the hose stop 106. As seen in FIG. 11, the slits 111 can project along the longitudinal axis from the leading end 94 to intersect a portion of the external compression threads 96.

The circumferentially compressible section 110 is initially in an uncompressed state and upon operable engagement of the hose fitting assembly, the circumferentially compressible section is deformed to form a substantially continuous periphery about the hose 20. In one configuration, the circumferentially compressible section 110 is sized such that upon deformation during engagement of the hose fitting assembly 10, the circumferentially compressible section does not create a detrimental bulge in the hose 20, nor form a sufficient gap in the deformed periphery which causes a portion of the hose to migrate into the gap, thereby locally degrading the hose. That is, the circumferentially compressible section 110 is formed so that upon deformation during operable engagement of the assembly 10, the compressed (deformed) configuration of the circumferentially compressible section is a substantially continuous periphery about an outer surface of the hose 20.

The swaging collar 120 includes a lead end 122, a trail end 124 and a central passage 125 extending between the lead end and the trail end.

The central passage 125 defines a first diameter 127 and a larger second diameter 129 with a taper 128 intermediate the first diameter and the second diameter. The first diameter 127 is sized to pass the hose 20 with the insertion stem 64 located within the hose 20 and forms a clamping section 126. The second diameter 129 is sized to receive a portion of the clamping sleeve 90.

Internal compressive threads 130 are formed along the central passage 125 at the second diameter 129, wherein the internal compressive threads are sized to cooperatively engage the external compression threads 96 of the clamping sleeve 90. The internal compressive threads 130 extend from proximal to the trail end 124 toward the taper 128 to define a set length 133. The internal compressive threads 130 are spaced from the taper 128 to defining a non-engaging gap 131 extending along the longitudinal dimension. In one configuration, it has been found advantageous to dispose a film of lubricant, lubricant with polytetrafluoroethylene or cutting fluid along at least a portion of the internal compressive threads 130 for assisting in operable engagement of the swaging collar 120 and the clamping sleeve 90.

A locking groove 134 is formed on the central passage 125, longitudinally intermediate the internal compressive threads 130 and the trail end 124. The locking groove 134 is sized to engage the locking flange 100 of the clamping sleeve 90.

The taper 128 is selected to impart a compressive force on the clamping sleeve 90 upon operable engagement of the internal compressive threads 130 of the swaging collar 120 and the external compression threads 96 of the clamping sleeve 90. The non engaging gap 131 between the taper 128 and the internal compressive threads 130 is sized to receive a substantial length of the external compression threads 96 of the clamping sleeve 90.

The slope or angle of the taper 128 relative to the longitudinal axis is selected to balance steepness which allows for relatively short longitudinal dimension but requires relatively large assembly forces and can impart too much deformation too early in the assembly process with a shallower slope (relative to the longitudinal axis) which can generate an increasing resistance to assembly to preclude complete assembly. Further, the lower or shallower angle increases the required length of the components, and hence length of the fitting assembly 10, thereby increasing material costs and decreasing aesthetics.

The angle of the taper 128 and the respective threads 96, 130 are selected to deform as few threads as possible when threading the swaging collar 120 relative to the clamping sleeve 90. In one configuration, the taper 128 is inclined relative to the longitudinal axis at an angle between approximately 10° and approximately 20°, with a more satisfactory angle of between approximately 13° and approximately 17°, wherein an angle of approximately 15° has been found satisfactory.

For selected configurations, it has been found advantageous to form (i) the non-engaging gap 131 of the swaging collar 120 to have a smaller longitudinal dimension than the predetermined length 97 of the external compression threads 96 of the clamping sleeve 90, and (ii) the free distance 99 between the external compression threads and the external fitting stop or shoulder 98 of the clamping sleeve to have a smaller longitudinal dimension than the set length 133 along the swaging collar 120.

In operation, the hose 20 is formed with a terminal end to which the present fitting assembly 10 is to be connected.

As seen in FIG. 14, the terminal end of the hose 20 is passed though the lead end 122 of the swaging collar 120 to pass through the central passage 125, and thereby slide the swaging collar along the hose. The leading end 92 of the clamping sleeve 90 is then passed over the terminal end of the hose 20 to pass the terminal end of the hose into the central passageway 105.

The terminal end of the hose is passed along the central passageway 105 until the terminal end contacts the hose stop 106. Thus, the swaging collar 120 is slidably moveable along the hose 20 and the terminal end of the hose is within the central passageway 105 of the clamping sleeve 90 and abuts the hose stop 106.

The insertion stem 64 of the end fitting 60 is then passed into the hose 20. The external trapping threads 66 of the insertion stem 64 engage the internal trapped threads 108 of the clamping sleeve 90. As the internal trapped threads 108 pass the external trapping threads 66 of the insertion stem 64, the internal trapped threads become located along the longitudinal axis in the capturing gap 67, intermediate the external trapping threads 66 and the external stop 68. Rotation of the end fitting 60, and hence insertion stem 64, relative to the clamping sleeve 90 is continued until the internal trapped threads 108 of the clamping sleeve 90 are entirely within the capturing gap 67 and threaded engagement of the end fitting and the clamping sleeve 90 is terminated. Thus, the clamping sleeve 90 can rotate freely relative to the end fitting 60, as the trapped threads 108 rotate without engagement in the capturing gap 67. This free rotation (non-threaded engagement) of the clamping sleeve 90 relative to the end fitting 60 allows for clocking of the end fitting relative to the clamping sleeve. By clocking, the installer can orient the end fitting 60 at any desired rotational position with respect to the clamping sleeve 90. Clocking is particularly advantageous for those end fittings having an asymmetry. Thus, the user can dispose the asymmetry at any orientation without impacting the construction or functioning of the hose fitting assembly 10.

The terminal end of the hose 20 is located at the hose stop 106 in the camping sleeve 90 and the clamping sleeve is located along the longitudinal axis with the trapped threads 108 in the capturing gap 67. Thus, the insertion stem 64, including the external barbs 70 are disposed at a predetermined location relative to the hose 20 along the longitudinal axis.

The swaging collar 120 is then passed along the hose 20 to engage the internal compressive threads 130 with the compression threads 96 of the clamping sleeve 90. As the internal compressive threads 130 engage the compression threads 96, the leading end 92 of the clamping sleeve 90 contacts the wide end of the taper 128.

Continued engagement of the internal compressive threads 130 with the compression threads 96 causes the leading end 92 of the clamping sleeve 90 to be driven into the taper 128 and the clamping section of the swaging collar 120. The circumferentially compressible section 110 of the clamping sleeve 90 is thus forced into the clamping section 126 of the swaging collar 120 and the circumferentially compressible section is deformed to the compressed state defining a substantially continuous periphery contacting the outside surface of the hose 20.

As the external compression threads 96 pass beyond the internal compressive threads 130 of the swaging collar 120, the external compression threads pass along the non engaging gap 131 in the swaging collar 120.

As the trail end 124 of the swaging collar 120 contacts the external shoulder 98 of the clamping sleeve 90, the circumferentially compressible section 110 of the clamping sleeve 90 has been deformed to a substantially continuous periphery about the hose 20 along a longitudinal distance overlying the barbs 70 of the insertion stem 64.

Further, as the trail end 124 of the swaging collar 120 contacts the external shoulder 98 of the clamping sleeve 90, least one of the internal compressive threads 130 and the external compression threads 96 deform, such as by rolling or flattening, thereby precluding an unthreading or operable disengagement of the swaging collar 120 and the clamping sleeve 90. That is, threaded engagement of the internal compressive threads 130 and the external compression threads 96 continues after the trail end 124 of the swaging collar 120 contacts the external shoulder 98 of the clamping sleeve 90, and thus imparts a deformation to at least one of the internal compressive threads and the external compression threads, thereby precluding non-destructive separation of the components.

Further, as the trail end 124 of the swaging collar 120 contacts the external shoulder 98 of the clamping sleeve 90, the locking flange 100 of the clamping sleeve 90 engages and seats into the locking groove 134 of the swaging collar 120 further precluding non-destructive separation of the swaging collar from the clamping sleeve, and thus precluding non-destructive separation of the end fitting from the clamping sleeve 90 and the hose 20.

Therefore, in the assembled configuration the insertion stem 64 is located within the hose 20 (just adjacent to the external trapping threads 66). The circumferentially compressible section 110 of the clamping sleeve 90 is deformed to a substantially continuous periphery about the hose, thereby clamping the hose 20 intermediate the insertion stem 64 and the clamping sleeve 90 (wherein delamination of the hose has not been employed). The hose 20 has been clamped about the retaining barbs 70 of the insertion stem 64. Further, the compressive force between the clamping sleeve 90, the insertion stem 64 and the intermediate portion of the hose 20 preclude relative movement of these components either along the longitudinal axis or rotationally.

The assembly is sized such that both (i) the locking groove 134 snaps over the locking flange 100 and (ii) the thread deformation occurs to ensure the connected components will at least resist and preferably preclude unintended unscrewing. While, the assembly may be functional with only one of (i) engagement of the locking flange 100 engagement and the locking groove 134 or (ii) the thread deformation, if only one of the two occurs it is possible for the threads to engage, thereby permitting unintended unscrewing of the components.

In addition, the components of the assembly 10 are configured so that the locking groove 134 cooperatively engages the locking flange 100, prior to the deformation of a portion of the internal compressive threads 130 and the external compression threads 96. Thus, upon the locking flange 100 cooperatively engaging the locking groove 134, the threaded engagement of the internal compressive threads 130 and the external compression threads 96 continues for at least approximately ¼ thread (turn) and up to approximately 1 thread (turn).

In addition, the locking flange 100 is seated within the locking groove 134 thereby substantially precluding separation of the clamping sleeve 90 from the swaging collar 120 along the longitudinal direction. That is, as the locking flange 100 is forced and deformation of the components serve to act as a snap ring precluding axial displacement of the swaging collar 120 and the clamping sleeve 90 (absent destructive forces). In addition, the deformation of at least one of a portion of internal compressive threads 130 and the external compression threads 96 precludes a threaded disengagement of the swaging collar 120 and the clamping sleeve 90, thereby rendering the connection sacrificial.

Thus, the hose fitting assembly 10 can be constructed by disposing the terminal end of the flexible hose 20 within the clamping sleeve 90 to contact the hose stop 106, then threading the external trapping threads 66 of the insertion stem 64 onto (and in selected configurations beyond) the internal trapped threads 108 of the clamping sleeve 90 to locate the internal trapped threads intermediate the external trapping threads and the spaced external stop 68 of the insertion stem; and the engaging internal compressive threads 130 of the swaging collar 120 with the external compression threads 96 of the clamping sleeve to compress the portion of the hose between the clamping sleeve and the insertion stem to form a high-pressure hydraulic hose assembly. Further, by providing deformation of (i) the clamping sleeve 90, (ii) at least one of the locking flange 100 and the locking groove 134, and (iii) at least a part of one of the compression thread 96 and the compressive threads 130, the hose fitting assembly 10 can preclude non-destructive separation of the swaging collar 120 and the clamping sleeve 90 and thus the hose 20 and end fitting 60 from the clamping sleeve 90. The non-destructive separation provides for the clamping sleeve 90 and the swaging collar 120 connected relative to the hose 20 to form the hose fitting assembly 10 having a burst strength of at least 5,000 psi and a tensile strength of at least 325 lbs.

Alternatively stated, the present system provides for affixing fittings to the flexible hose 20 having a terminal end, by compressing a length of the clamping sleeve 90 to retain a portion of the hose 20 between the inner surface of the clamping sleeve 90 and the insertion stem 64 disposed within the hose 20, wherein the compressed length of the hose 20 is sufficient to preclude reengagement of external trapping threads 66 on the insertion stem 64 with internal trapped threads 108 of the clamping sleeve 90.

The system provides for employing the swaging collar 120 for compressing the length of the clamping sleeve 90, and the action of assembling providing sufficient deformation to preclude non-destructive separation of the clamping sleeve 90 and the swaging collar 120 in response to less than 15 ft-lbs force in putting the assembly 10 together.

Thus, the constructed hose assembly 10 precludes non-destructive separation. That is, the hose fitting assembly 10 is sacrificial, in that at least a portion of the assembly 10 must be destroyed (rendered inoperable) in order to disassemble to the fitting.

The generated resistance of longitudinal movement of the hose 20 relative to the clamping sleeve 90 and hence the insertion stem 64, effectively precludes reengagement of the external trapping threads 66 of the end fitting 60 with the internal trapped threads 108 of the clamping sleeve 90 thereby precluding unscrewing of the end fitting 60 until the tensile strength of the assembly 10 has been overcome.

In selected configurations the deformation of a portion of the threads on the clamping sleeve 90, such as the external compression threads 96, resists non destructive disassembly or separation of the components. In addition, the dimension of the threads can be selected such that upon operable engagement of the components, the threaded engagements used for construction are all disengaged, deformed or a combination thereof. Further, it has been found satisfactory to employ a relatively fine thread, so that a sufficient wall thickness can be maintained without unduly increasing the dimensions of the relative component.

In one configuration, upon operable construction of the assembly 10, the threads between the end fitting 60 and the clamping sleeve 90 are disengaged, while the threaded connection between the clamping sleeve and the swaging collar 120 remains engaged—such as on the order of approximately ⅛ thread to a 1.5 threads. Specifically, approximately ¼ and up to approximately a full (and typically between approximately ¼ and ⅔) thread between the external compression threads 96 and the internal compressive threads 130 of the swaging collar remain engaged and at least partially deformed upon operably connection of the hose fitting assembly 10.

The components can be selected to provide that the assembled hose fitting assembly meets 49 CFR 571.106 for burst strength, tensile strength and whip resistance and the US Department of Transportation, National Highway Traffic Safety Administration Laboratory Test Procedure for Federal Motor Vehicle Safety Standards (FMVSS) 106 Brake Hoses, TP-106-10, Apr. 10, 2008. More particularly, the assembled hose fitting is constructed to meet these requirements, which provide in relevant part:

S5.3 Test requirements. A hydraulic brake hose assembly or appropriate part thereof shall be capable of meeting any of the requirements set forth under this heading, when tested under the conditions of the temperature of the testing room is 75° F. (24° C.); the brake hoses and brake hose assemblies are at least 24 hours old, and unused, and the specified test pressures are gauge pressures (psig) and the applicable procedures set forth below.

S5.3.1 Constriction. Except for that part of an end fitting which does not contain hose, every inside diameter of any section of a hydraulic brake hose assembly shall be not less than 64 percent of the nominal inside diameter of the brake hose.

S5.3.2 Expansion and burst strength. The maximum expansion of a hydraulic brake hose assembly at 1,000 psi, 1,500 psi and 2,900 psi shall not exceed the values specified in Table I, except that a brake hose larger than 3/16 inch or 5 mm is not subject to the 2,900 psi expansion test requirements. The hydraulic brake hose assembly shall then withstand water pressure of 4,000 psi for 2 minutes without rupture, and then shall not rupture at less than 7,000 psi for a ⅛ inch, 3 mm, or smaller diameter hose, or at less than 5,000 psi for a hose with a diameter larger than ⅛ inch or 3 mm.

TABLE I

Maximum Expansion of Free Length Brake Hose, CC/FT

| Hydraulic brake hose, inside diameter | Test Pressure | | | | | |
|---|---|---|---|---|---|---|
| | 1,000 psi | | 1,500 psi | | 2,900 psi | |
| | Regular expansion hose | Low expansion hose | Low expansion hose | Regular expansion hose | Regular expansion hose | Low expansion hose |
| ⅛ inch, or 3 mm, or less | 0.66 | 0.33 | 0.79 | 0.42 | 1.21 | 0.61 |
| >⅛ inch or 3 mm, to 3/16 inch or 5 mm | 0.86 | 0.55 | 1.02 | 0.72 | 1.67 | 0.91 |
| >3/16 inch or 5 mm | 1.04 | 0.82 | 1.30 | 1.17 | * | * |

S5.3.3 Whip resistance. A hydraulic brake hose assembly shall not rupture when run continuously on a flexing machine for 35 hours.

S5.3.4 Tensile strength. A hydraulic brake hose assembly shall withstand a pull of 325 pounds without separation of the hose from its end fittings during a slow pull test, and shall withstand a pull of 370 pounds without separation of the hose from its end fittings during a fast pull test.

S5.3.5 Water absorption and burst strength. A hydraulic brake hose assembly, after immersion in water for 70 hours, shall withstand water pressure of 4,000 psi for 2 minutes, and then shall not rupture at less than 5,000 psi.

S5.3.6 Water absorption and tensile strength. A hydraulic brake hose assembly, after immersion in water for 70 hours, shall withstand a pull of 325 pounds without separation of the hose from its end fittings during a slow pull test, and shall withstand a pull of 370 pounds without separation of the hose from its end fittings during a fast pull test.

S5.3.7 Water absorption and whip resistance. A hydraulic brake hose assembly, after immersion in water for 70 hours, shall not rupture when run continuously on a flexing machine for 35 hours.

S5.3.8 Low-temperature resistance. A hydraulic brake hose conditioned at a temperature between minus 49° F. (minus 45° C.) and minus 54° F. (minus 48° C.) for 70 hours shall not show cracks visible without magnification when bent around a cylinder as specified in S6.6.

S5.3.9 Brake fluid compatibility, constriction, and burst strength. Except for brake hose assemblies designed for use with mineral or petroleum-based brake fluids, a hydraulic brake hose assembly shall meet the constriction requirement of S5.3.1 after having been subjected to a temperature of 248° F. (120° C.) for 70 hours while filled with SAE RM-66-04 "Compatibility Fluid," as described in appendix B of SAE Standard J1703, revised January 1995, "Motor Vehicle Brake Fluid." Copies may be obtained from the Society of Automotive Engineers, Inc., 400 Commonwealth Drive, Warrendale, Pa. 15096-0001. Copies may be inspected at the National Highway Traffic Safety Administration, Technical Information Services, 400 Seventh Street, SW., Plaza Level, Room 403, Washington, D.C. 20590, or at the National Archives and Records Administration (NARA). It shall then withstand water pressure of 4,000 psi for 2 minutes and thereafter shall not rupture at less than 5,000 psi (S6.2 except all sizes of hose are tested at 5,000 psi).

S5.3.10 Ozone resistance. A hydraulic brake hose shall not show cracks visible under 7-power magnification after exposure to ozone for 70 hours at 104° F.

S5.3.12 High temperature impulse test. A brake hose assembly tested under the conditions in S6.10: (a) shall withstand pressure cycling for 150 cycles, at 295° F. (146° C.) without leakage; (b) shall not rupture during a 2-minute, 4,000 psi pressure hold test, and; (c) shall not burst at a pressure less than 5,000 psi.

S5.3.13 End fitting corrosion resistance. After 24 hours of exposure to salt spray, a hydraulic brake hose end fitting shall show no base metal corrosion on the end fitting surface except where crimping or the application of labeling information has caused displacement of the protective coating.

S6. Test procedures—Hydraulic brake hose, brake hose assemblies, and brake hose end fittings.

S6.1. Expansion test.

S6.1.1 Apparatus. Utilize a test apparatus (as shown in FIG. 18) which consists of: (a) source for required fluid pressure; (b) test fluid of water without any additives and free of gases; (c) reservoir for test fluid; (d) pressure gauges; (e) brake hose end fittings in which to mount the hose vertically; and (f) graduate burette with 0.05 cc increments.

S6.1.2 Preparation: (a) measure the free length of the hose assembly, (b) mount the hose so that it is in a vertical straight position without tension when pressure is applied, (c) fill the hose with test fluid and bleed all gases from the system, and (d) close the valve to the burette and apply 1,500 psi for 10 seconds; then release pressure.

S6.1.3 Calculation of expansion at 1,000 and 1,500 psi. (a) adjust the fluid level in the burette to zero, (b) close the valve to the burette, apply pressure at the rate of 15,000 psi per minute, and seal 1,000 psi in the hose (1,500 psi in the second series, and 2,900 psi in the third series). (c) after 3 seconds open the valve to the burette for 10 seconds and allow the fluid in the expanded hose to rise into the burette, (d) repeat the procedure in steps (b) and (c) twice, (measure the amount of test fluid which has accumulated in the burette as a result of the three applications of pressure) and (e) calculate the volumetric expansion per foot by dividing the total accumulated test fluid by three (3) and further dividing by the free length of the hose, in feet.

S6.2 Burst strength test. (a) Connect the brake hose to a pressure system and fill it completely with water, allowing all gases to escape, (b) apply water pressure of 4,000 psi at a rate of 15,000 psi per minute, and (c) after 2 minutes at 4,000 psi, increase the pressure at the rate of 15,000 psi per minute until the pressure exceeds 5,000 psi for a brake hose larger than ⅛ inch or 3 mm diameter, or until the pressure exceeds 7,000 psi for a brake hose of ⅛ inch, 3 mm, or smaller diameter.

S6.3 Whip resistance test.

S6.3.1 Apparatus. Utilize test apparatus that is dynamically balanced and includes: (a) a movable header consisting of a horizontal bar equipped with capped end fittings and mounted through bearings at each end to points 4 inches from the center of two vertically rotating disks whose edges are in the same vertical plane; (b) an adjustable stationary header parallel to the movable header in the same horizontal plane as the centers of the disks, and fitted with open end fittings; (c) an elapsed time indicator; and (d) a source of water pressure connected to the open end fittings.

S6.3.2 Preparation. (a) Except for the supplemental support specified in S6.3.2(d), remove all external appendages including, but not limited to, hose armor, chafing collars, mounting brackets, date band and spring guards, (b) measure the hose free length, and (c) mount the hose in the whip test machine, introducing slack as specified in Table II for the size hose tested, measuring the projected length parallel to the axis of the rotating disks. (The manufacturer may, at their option, adapt the fitting attachment points to permit mounting hose assemblies equipped with angled or other special fittings in the same orientation as hose assemblies equipped with straight fittings), (d) in the case of a brake hose assembly equipped with a permanent supplemental support integrally attached to the assembly, the assembly may be mounted using the supplemental support and associated means of simulating its attachment to the vehicle. (Mount the supplemental support in the same vertical and horizontal planes as the stationary header end of the whip test fixture described in S6.3.1(b). Mount or attach the supplemental support so that it is positioned in accordance with the recommendation of the assembly manufacturer for attaching the supplemental support on a vehicle.).

TABLE II

| | Hose Lengths | |
|---|---|---|
| | Slack, inches | |
| Free length between end fittings, inches | ⅛ inch or 3 mm hose or less | More than ⅛ inch or 3 mm hose |
| 8 to 15½, inclusive | 1.750 | |
| 10 to 15½, inclusive | | 1,000 |
| Over 15½ to 19 inclusive | 1.250 | |
| Over 19 to 24, inclusive | 0.750 | |

S6.3.3 Operation. (a) apply 235 psi water pressure and bleed all gases from the system and (b) drive the movable head at 800 rpm.

S6.4 Tensile strength test. Utilize a tension testing machine conforming to the requirements of American Society for Testing and Materials (ASTM) E4-03, "Standard Practices for Force Verification of Testing Machines," and provided with a recording device to measure the force applied. Copies may be inspected at the National Highway Traffic Safety Administration, Technical Information Services, 400 Seventh St., S.W., Plaza Level, Room 403, Washington, D.C. 20590, or at the National Archives and Records Administration (NARA).

S6.4.1 Preparation. Mount the hose assembly to ensure straight, evenly distributed machine pull.

S6.4.2 Operation: (a) conduct the slow pull test by applying tension at a rate of 1 inch per minute travel of the moving head until separation occurs, and (b) conduct the fast pull test by applying tension at a rate of 2 inches per minute travel of the moving head until separation occurs.

S6.5 Water absorption sequence tests. (a) prepare three brake hose assemblies and measure the free length of the hose assemblies, (b) immerse the brake hose assemblies in distilled water at 185° F. (85° C.) for 70 hours. Remove the brake hose assemblies from the water and condition in air at room temperature for 30 minutes, and (c) conduct the tests in S6.2, S6.3, and S6.4, using a different hose for each sequence.

S6.6 Low temperature resistance test.

S6.6.1 Preparation. (a) remove hose armor, if any, and condition the hose in a straight position in air at a temperature between minus 49° F. and minus 54° F. (minus 45° C. and minus 48° C.) for 70 hours, (b) condition a cylinder in air at a temperature between minus 49° F. and minus 54° F. (minus 45° C. and minus 48° C.) for 70 hours, using a cylinder of 2½ inches in diameter for tests of hose less than ⅛ inch or 3 mm, 3 inches in diameter for tests of ⅛ inch or 3 mm hose, 3½ inches in diameter for tests of 3/16 to ¼ inch hose or 4 mm to 6 mm hose, and 4 inches in diameter for tests of hose greater than ¼ inch or 6 mm in diameter.

S6.6.2 Flexibility testing. Bend the conditioned hose 180 degrees around the conditioned cylinder at a steady rate in a period of 3 to 5 seconds. Examine without magnification for cracks.

S6.7 Brake fluid compatibility test.

S6.7.1 Preparation. (a) attach a hose assembly below a 1-pint reservoir filled with 100 ml. of SAE RM-66-04 Compatibility Fluid as shown in FIG. 19. (SAE RM-66-03 Compatibility Fluid, as described in appendix A of SAE Standard J1703 NOV83, "Motor Vehicle Brake Fluid," November 1983, may be used in place of SAE RM-66-04 until Jan. 1, 1995.), and (b) fill the hose assembly with brake fluid, seal the lower end, and place the test assembly in an oven in a vertical position.

S6.7.2 Oven treatment. (a) condition the hose assembly at 200° F. for 70 hours, (b) cool the hose assembly at room temperature for 30 minutes, (c) drain the brake hose assembly, immediately determine that every inside diameter of any section of the hose assembly, except for that part of an end fitting which does not contain hose, is not less than 64 percent of the nominal inside diameter of the hose, and conduct the test specified in S6.2.

S6.8 Ozone resistance test. Utilize a cylinder with a diameter eight times the nominal outside diameter of the brake hose excluding armor.

S6.8.1 Preparation. After removing any armor, bind a hydraulic brake hose 360° around the cylinder. In the case of hose shorter than the circumference of the cylinder, bend the hose so that as much of its length as possible is in contact.

S6.8.2 Exposure to ozone. (a) condition the hose on the cylinder in air at room temperature for 24 hours, (b) immediately thereafter, condition the hose on the cylinder for 70 hours in an exposure chamber having an ambient air temperature of 104° F. (40° C.) during the test and containing air mixed with ozone in the proportion of 100 parts of ozone per 100 million parts of air by volume, and (c) examine the hose for cracks under 7-power magnification, ignoring areas immediately adjacent to or within the area covered by binding.

S6.9 End fitting corrosion resistance test. Utilize the apparatus described in ASTM B117-64, "Salt Spray (Fog) Testing".

S6.9 Dynamic ozone test.

S6.9.1 Apparatus. Utilize a test apparatus as shown in FIG. 20 which is constructed so that: (a) it has a fixed pin with a vertical orientation over which one end of the brake hose is installed, (b) it has a movable pin that is oriented 30 degrees from vertical, with the top of the movable pin angled towards the fixed pin. The moveable pin maintains its orientation to the fixed pin throughout its travel in the horizontal plane. The other end of the brake hose is installed on the movable pin.

S6.9.2 Preparation. (a) precondition the hose assembly by laying it on a flat surface in an unstressed condition, at room temperature, for 24 hours, (b) cut the brake hose assembly to a length of 8.6 inches (218 mm), such that no end fittings remain on the cut hose, (c) mount the brake hose onto the test fixture by fully inserting the fixture pins into each end of the hose (secure the hose to the fixture pins using a band clamp at each end of the hose), (d) place the test fixture into an ozone chamber, (e) stabilize the atmosphere in the ozone chamber so that the ambient temperature is 104° F. (40° C.) and the air mixture contains air mixed with ozone in the proportion of 100 parts of ozone per 100 million parts of air by volume (this atmosphere is to remain stable throughout the remainder of the test), (f) begin cycling the movable pin at a rate of 0.3 Hz. Continue the cycling for 48 hours, and (g) at the completion of 48 hours of cycling, remove the test fixture from the ozone chamber (Without removing the hose from the test fixture, visually examine the hose for cracks without magnification, ignoring areas immediately adjacent to or within the area covered by the band clamps. Examine the hose with the movable pin at any point along its travel.).

S6.10 High temperature impulse test.

S6.10.1 Apparatus. (a) a pressure cycling machine to which one end of the brake hose assembly can be attached, with the entire hose assembly installed vertically inside of a circulating air oven. The machine shall be capable of increasing the pressure in the hose from zero psi to 1600 psi, and decreasing the pressure in the hose from 1600 psi to zero psi, within 2 seconds, (b) a circulating air oven that can reach a temperature of 295° F. (146° C.) within 30 minutes, and that can maintain a constant 295° F. (146° C.) thereafter, with the brake hose assembly inside of the oven and attached to the pressure cycling machine, and (c) a burst test apparatus to conduct testing specified in S6.2.

S6.10.2 Preparation. (a) connect one end of the hose assembly to the pressure cycling machine and plug the other end of the hose. Fill the pressure cycling machine and hose assembly with SAE RM-66-04 "Compatibility Fluid," as described in appendix B of SAE Standard J1703, revised January 1995 "Motor Vehicle Brake Fluid," and bleed all gases from the system, (b) place the brake hose assembly inside of the circulating air oven in a vertical position. Increase the oven temperature to 295° F. (146° C.) and maintain this temperature throughout the pressure cycling test, (c) during each pressure cycle, the pressure in the hose is increased from zero psi to 1600 psi and held constant for 1 minute, then the pressure is decreased from 1600 psi to zero psi and held constant for 1 minute. Perform 150 pressure cycles on the brake hose assembly, (d) remove the brake hose assembly from the oven, disconnect it from the pressure cycling machine, and drain the fluid from the hose (Cool the brake hose assembly at room temperature for 45 minutes), and (e) wipe the brake hose using acetone to remove residual Compatibility Fluid. Conduct the burst strength test in S6.2, except all sizes of hose are tested at 5,000 psi.

S6.11 End fitting corrosion test. Utilize the apparatus described in ASTM B117-03, "Standard Practice for Operating Salt Spray (Fog) Apparatus". Copies may be obtained from the American Society for Testing and Materials (ASTM) International, 100 Barr Harbor Drive, P.O. Box C700, West Conshohocken, Pa. 19428-2959. Copies may be inspected at the National Highway Traffic Safety Administration, Technical Information Services, 400 Seventh St., SW., Plaza Level, Room 403, Washington, D.C. 20590, or at the National Archives and Records Administration (NARA).

S6.11.1 Construction. Construct the salt spray chamber so that: (a) the construction material does not affect the corrosiveness of the fog, (b) the hose assembly is supported or suspended 30 degrees from the vertical and parallel to the principal direction of the horizontal flow of fog through the chamber, (c) the hose assembly does not contact any metallic material or any material capable of acting as a wick, (d) condensation which falls from the assembly does not return to the solution reservoir for respraying, (e) condensation from any source does not fall on the brake hose assemblies or the solution collectors, and (f) spray from the nozzles is not directed onto the hose assembly.

S6.11.2 Preparation. (a) Plug each end of the hose assembly, (b) mix a salt solution five parts by weight of sodium chloride to 95 parts of distilled water, using sodium chloride substantially free of nickel and copper, and containing on a dry basis not more than 0.1 percent of sodium iodide and not more than 0.3 percent total impurities. (Ensure that the solution is free of suspended solids before the solution is atomized), (c) after atomization at 95° F. (35° C.), ensure that the collected solution is in the pH range of 6.5 to 7.2. (Make the pH measurements at 77° F. (28° C.)), and (d) maintain a compressed air supply to the nozzle or nozzles free of oil and dirt and between 10 and 25 psi.

S6.11.3 Operation. Subject the brake hose assembly to the salt spray continuously for 24 hours: (a) regulate the mixture so that each collector will collect from 1 to 2 milliliters of solution per hour for each 80 square centimeters of horizontal collecting area, (b) maintain exposure zone temperature at 95° F. (35° C.), and (c) upon completion, remove the salt deposit from the surface of the hose by washing gently or dipping in clean running water not warmer than 100° F. (38° C.) and then drying immediately.

S6.12 Constriction test. Brake hose constriction test requirements shall be met using at least one of the methods specified in S6.12.1, S6.12.2, or S6.12.3.

S6.12.1 Plug gauge. (a) utilize a plug gauge as shown in FIG. 21. Diameter "A" is equal to 64 percent of the nominal inside diameter of the hydraulic brake hose being tested, (b) brake hose assemblies that are to be used for additional testing have constriction testing only at each end fitting. (Other brake hose assemblies may be cut into 3-inch lengths to permit constriction testing of the entire assembly. Hose assemblies with end fittings that do not permit entry of the gauge (e.g., restrictive orifice or banjo fitting) are cut 3 inches from the point at which the hose terminates in the end fitting and then tested from the cut end), (c) hold the brake hose in a straight position and vertical orientation, (d) place the spherical end of the plug gauge just inside the hose or end fitting. (If the spherical end will not enter the hose or end fitting using no more force than gravity acting on the plug gauge, this constitutes failure of the constriction test), and (e) release the plug gauge. (Within 3 seconds, the plug gauge shall fall under the force of gravity alone up to the handle of the gauge. If the plug gauge does not fully enter the hose up to the handle of the gauge within three seconds, this constitutes failure of the constriction test.).

S6.12.2 Extended plug gauge. (a) the test in 6.12.1 may be conducted with an extended plug gauge to enable testing of the entire brake hose from one end fitting, without cutting the brake hose. The extended plug gauge weight and spherical diameter specifications are as shown in FIG. 18, but the handle portion of the gauge may be deleted and the gauge length may be greater than 3 inches, (b) the required performance of the extended plug gauge in S6.12.1(e) is that after the plug gauge is released, the extended plug gauge shall fall under the force of gravity alone at an average rate of 1 inch per second until the spherical diameter of the extended gauge passes through all portions of the brake hose assembly containing hose. If the extended plug gauge does not pass through all portions of the brake hose assembly containing hose at an average rate of 1 inch per second, this constitutes failure of the constriction test.

S6.12.3 Drop ball test. (a) utilize a rigid spherical ball with a diameter equal to 64 percent of the nominal inside diameter of the hydraulic brake hose being tested (the weight of the spherical ball shall not exceed 2 ounces (57 grams)), (b) hold the brake hose in a straight position and vertical orientation, (c) hold the ball just above the end fitting, (d) release the ball. (The ball shall fall under the force of gravity alone completely through all portions of the brake hose assembly containing hose, at an average rate of 1 inch per second. Failure of the ball to pass completely through all portions of the brake hose assembly containing hose, at an average rate of 1 inch per second, constitutes failure of the constriction test.)

The present assembly 10 can also meet the SAE J1401 standard, as Revised June 2003 which provide:

4.2.12.4 Place the assemblies in the circulating air oven, and within 30 min attain an oven temperature of 146° C.±3° C. (295° F.±5° F.).

4.2.12.5 Subject the assemblies to a cycling internal pressure of 11 MPa+0.5, −0 MPa (1600 psi+75, −0 psi) for 1 min±0.1 min and 0 pressure for 1 min±0.1 min; pressures to be attained within 2 seconds.

4.2.12.6 Pressure cycle assemblies for 150 cycles minimum.

4.2.12.7 Remove the assemblies from the oven. Disconnect the assemblies from the impulse apparatus, and drain the fluid.

4.2.12.8 Cool the assemblies in air at room temperature for 45 min minimum.

4.2.12.9 Subject the assemblies to the burst test in 4.2.4.

4.2.13 Dynamic ozone test 4.2.13.1 Test Apparatus—Brake hose cut lengths of 218 mm±3 mm (8.6 in±0.1 in), SAE dynamic ozone test apparatus that will flex the brake hose as shown in FIG. 22 and the ozone test chamber.

4.2.13.2 Precondition all the brake hose samples in a non-stressed condition at 27° C.±6° C. (80° F.±10° F.) for at least 24 h prior to the start of the test.

4.2.13.3 Assemble the brake hose samples on the SAE dynamic ozone test apparatus so that they meet the relative position and flex parameters as shown in FIG. 22. Install the brake hose over the fixture pins until the hose has bottomed out. Use band clamps to securely retain the brake hose on the pin. Install the test apparatus and assembled hoses in a stabilized ozone chamber. The chamber shall contain air mixed with ozone at the ozone partial pressure of 100 mPa±10 mPa (100 parts of ozone per 100 million parts of air by volume±10 parts of ozone per 100 million parts of air by volume.) The air temperature in the chamber shall be 40° C.±3° C. (104° F.±5° F.).

4.2.13.4 Start cycling when the chamber reaches the specified ozone concentration but no later than 1 h after putting the test apparatus in the ozone chamber. The flex rate shall be 0.30 Hz±0.05 Hz. The stroke shall be 76.2 mm±2.5 mm (3.0 in ±0.1 in).

4.2.13.5 Examine the hoses for ozone cracks every 24 h±1 h. Remove the fixture from the cabinet and close the door immediately. Inspect for ozone cracks visible to the eye without magnification at the worst stress condition ignoring the areas immediately adjacent to or within the area covered by the band clamps. Do not remove the hoses from the fixture. Reinstall the fixture in the cabinet within 15 min of its removal. The test shall be run continuously except for the daily inspection periods. Inspection periods may be eliminated on non-work days if determined to be not critical.

4.2.13.6 Stop test when ozone cracks are observed. Record the hose identification and the number of days that elapsed until the first visible crack was observed.

5. Performance Requirements 5.1 100% Pressure Test—Hose assemblies showing leaks under this test shall be rejected and destroyed.

5.2 Constriction Test—Hose assemblies not allowing passage of the gage plug shall be rejected and destroyed. The constriction requirement does not apply to that part of the brake hose end fitting which does not contain hose.

5.3 Volumetric Expansion Test—The maximum expansion of any of the hose assemblies tested shall not exceed the values in Table 4.

5.4 Burst Test—When tested under hydraulic pressure, each sample of hose shall withstand a 2 min pressure hold at 27.6 MPa (4000 psi), and shall have a minimum burst pressure of 49 MPa (7000 psi) for 3.5 mm or less (⅛ in or less) hose, and 34.5 MPa (5000 psi) for 4 to 5 mm (3/16 in) hose.

5.5 Brake Fluid Compatibility Test—The hydraulic brake hose assembly shall meet the constriction requirement (4.2), and there shall be no leakage during a 2 min, 27.6 MPa (4000 psi) pressure hold, and the assembly shall not burst at less than 34.5 MPa (5000 psi).

5.6 Whip Test—The minimum life of any one of the sample hose assemblies on the flexing machine shall be 35 hours.

5.7 Tensile Test—The hose assembly shall withstand the minimum load listed in Table 3 without the end fittings pulling off or rupture of the hose.

5.8 Cold Bend Test—The hose cover shall not crack (visible without magnification) or break.

5.9 Ozone Test—The outer cover of the hose shall show no cracking when examined under 7× magnification.

5.10 Salt Spray Test—The hose assembly end connections shall have no base metal corrosion. The area of the fitting where crimping or the application of labeling information has caused the displacement of the protective coating is exempt from the corrosion requirements. Brass fittings have adequate corrosion resistance; therefore, salt spray testing of brass fittings is not required.

5.11 Water Absorption Tests—Water conditioned hose assemblies shall pass all burst (5.4), whip (5.6), and tensile (5.7) requirements as outlined for nonaged brake hose assemblies.

5.12 Hot Impulse Test 5.12.1 The hose assemblies shall withstand impulsing for 150 cycles without leakage.

5.12.2 There shall be no leakage during a 2 min, 27.6 MPa (4000 psi) pressure hold.

5.12.3 The assembly shall not burst at less than 34.5 MPa (5000 psi).

5.13 Dynamic Ozone Test—The hose shall not crack after testing a minimum of 48 h.

6. Construction 6.1 Hose—The hose shall consist of an elastomeric inner tube, two or more layers of reinforcing cord imbedded in and/or bonded to the elastomeric inner tube and outer cover. The cover must be a black stock, free from sulfur bloom, which will not crack when subjected to long periods of weather aging. The inner tube of this hose must be a stock which will effectively resist deterioration by nonpetroleum-base hydraulic brake fluids as designated in Section 1.

6.2 Hose Assembly—Each hydraulic brake hose assembly shall have permanently attached brake hose end fittings.

TABLE 4

MAXIMUM EXPANSION OF FREE LENGTH HOSE

| Hose ID | Test Pressure 6.9 MPa (1000 psi) Low Expansion Hose | Test Pressure 6.9 MPa (1000 psi) Regular Expansion Hose | Test Pressure 10.3 MPa (1500 psi) Low Expansion Hose | Test Pressure 10.3 MPa (1500 psi) Regular Expansion Hose | Test Pressure 20.0 MPa (2900 psi) Low Expansion Hose | Test Pressure 20.0 MPa (2900 psi) Regular Expansion Hose |
|---|---|---|---|---|---|---|
| 3.5 mm or less (⅛ in or less) | 1.08 cm³/m (0.33 cm³/ft) | 2.17 cm³/m (0.66 cm³/ft) | 1.38 cm³/m (0.42 cm³/ft) | 2.59 cm³/m (0.79 cm³/ft) | 2.0 cm³/m (0.61 cm³/ft) | 4.0 cm³/m (1.21 cm³/ft) |
| 4 to 5 mm (3/16 in) | 1.81 cm³/m (0.55 cm³/ft) | 2.82 cm³/m (0.86 cm³/ft) | 2.36 cm³/m (0.72 cm³/ft) | 3.35 cm³/m (1.02 cm³/ft) | 3.0 cm³/m (0.91 cm³/ft) | 5.5 cm³/m (1.67 cm³/ft) |

7. Hose Identification—The brake hose of each manufacturer shall be identified by one or more colored yarns incorporated into the construction. Embossed or imprinted (3-dimensional) marking on the brake hose cover may be used in lieu of marker yarn identification.

In addition, the present hose fitting assembly can provide for operable constructive with less than approximately 15 ft-lb torque, and with configurations employing the lubricant on the swaging collar, between approximately 3.5 to 5 ft-lb. That is, hose assembly meeting the tensile, burst and whip standards set forth above can be provided with approximately 3.5 to 5 ft-lb torque for construction.

Thus, in one construction, the hose fitting assembly can be used for engaging a high-pressure hydraulic hose having the terminal end, wherein the hose fitting assembly includes the end fitting having the insertion stem extending along the longitudinal dimension, with a length of the insertion stem sized to be disposed within the hose. The length of the insertion stem disposed within the hose is selected to substantially extend, at least, throughout the length of the overlying clamping sleeve. The external trapping threads extend along the fixed length of the longitudinal dimension. The external stop is spaced along the longitudinal dimension from the external trapping threads by a capturing gap.

The hose fitting assembly can further include the clamping sleeve having the leading end, the trailing end and the central passageway on the leading end sized to receive a length of the hose, the central passageway defines the hose stop and has internal trapped threads extending along the given length of longitudinal dimension. The central passage is formed on the trailing end to receive the end fitting. The clamping sleeve also includes external compression threads extending along the predetermined length of the longitudinal dimension, the external fitting stop and the circumferentially compressible section, the external compression threads spaced from the external fitting stop by the free distance.

The hose fitting assembly also includes the swaging collar having the lead end, the trail end and the central passage extending between the lead end and the trail end. The central passage includes internal compressive threads sized to engage the external compression threads of the clamping sleeve. The central passage also defines the taper and the clamping section. The central passage is sized to receive the portion of the clamping sleeve, and the internal compressive threads extending along the set length of the longitudinal dimension and spaced from the taper by the non-engaging gap.

In one configuration, the non-engaging gap is less than the predetermined length and the free distance is less than the set length.

In addition, one of the clamping sleeve and the swaging collar can include one of the locking flange and the locking groove, wherein the remaining one of the clamping sleeve and the swaging collar can include the remaining one of the locking flange and the locking groove. The locking flange and the locking groove are selected such that at least one of the components is at least sufficiently deformed to preclude reuse.

Thus, the deformation of the clamping sleeve, at least one of the locking flange and the locking recess, and one of the compression threads and the compressive threads acts to provide a permanent engagement as defined in 49 CFR §71.106 as of the date of the patent application and as set forth herein, and at least one of the components of the hose fitting assembly is sacrificial.

In one configuration, the present system can provide strain relief through the construction of the hose in conjunction with the hose fitting assembly without a separate component extending along the hose to change a radius of curvature, or a commercially imparted bell flange.

Referring to FIGS. 23 and 24, an alternative configuration of a hose fitting assembly is shown. In this configuration, the end fitting and the clamping sleeve are functionally combined into a clamping sleeve end assembly 220. The clamping sleeve end assembly 220 includes the coupling interface 62, the insertion stem 64 and the barbs 70 as in the end fitting 60. The clamping sleeve end assembly 220 further includes the leading end 92, the external compression threads 96, the predetermined length 97, the external shoulder 98, the free distance 99, the locking flange 100, the wrench flats 102, the central passageway 105, the hose stop 106 and the circumferentially compressible section 110.

The clamping sleeve end assembly 220 can be formed by separately forming the insertion stem 64 from the coupling interface 62 and clamping sleeve features, and subsequently connecting the components. Thus, the insert stem is seated within the central passageway 105 and cooperates with the hose stop 106 within the central passageway.

However, it is also understood that either one of the clamping sleeve end assembly 220 and the swaging collar 120 can include one of the locking flange and the locking groove, wherein the remaining one of the clamping sleeve end assembly and the swaging collar can include the remaining one of the locking flange and the locking groove. The locking flange and the locking groove are selected such that at least one of the components is at least sufficiently deformed to preclude reuse.

The insertion of a length of hose 20 within the clamping sleeve end assembly 220 and operable engagement with the swaging collar proceed as previously set forth.

Thus, the deformation of the clamping sleeve end assembly 220, at least one of the locking flange and the locking recess, or one of the compression threads and the compressive threads acts to provide a permanent engagement with the hose 20 as defined in 49 CFR §71.106 as of the date of the patent application and as set forth herein, and at least one of the components of the hose fitting assembly 10, 210 is sacrificial. Further, the clamping sleeve end assembly 220, the hose 20 and the swaging collar 120 can be assembled to meet the SAE J1401 standard, as Revised June 2003.

Thus, in selected configurations, the present disclosure provides a method of affixing fittings to a flexible high-pressure hydraulic hose having a terminal end, the method comprising (a) disposing the terminal end of the flexible hose within a clamping sleeve to contact a hose stop (b) threading external trapping threads of an insertion stem passed internal trapped threads of the clamping sleeve to locate the internal trapped threads of the clamping sleeve intermediate the external trapping threads and an external stop of the insertion stem; and (c) engaging internal compressive threads of a swaging collar with external compression threads of the clamping sleeve to compress a portion of the hose between the clamping sleeve and the insertion stem to form a high-pressure hydraulic hose assembly. The method can further include providing means for precluding non-destructive separation of the swaging collar and the clamping sleeve. The method can also provide that engaging the clamping sleeve and the swaging collar requires less than (i) approximately 15 ft-lbs of torque or (ii) less than approximately 6 ft-lbs of torque. The method can further include engaging the end fitting, the clamping sleeve and the swaging collar relative to the hose to form a hose fitting assembly having a burst strength of at least 5,000 psi and a tensile strength of at least 325 lbs.

The present disclosure further provides a method of affixing fittings to a flexible hose having a terminal end, the method comprising circumferentially compressing a length of a clamping sleeve to retain a portion of the hose between an inner surface of the clamping sleeve and an insertion stem disposed within the hose, the compressed length of the hose sufficient to preclude reengagement of external trapping threads on the insertion stem with internal trapped threads of the clamping sleeve. It is contemplated this method can further comprise employing a swaging collar for compressing the length of the clamping sleeve, and providing means for precluding non-destructive separation of the clamping sleeve and the swaging collar. It is also contemplated this method can further comprise that engaging the clamping sleeve and the swaging collar requires (i) less than approximately 15 ft-lbs of torque or (ii) less than approximately 6 ft-lbs of torque. This method can further comprise engaging the clamping sleeve and the swaging collar to form a hose fitting assembly having a burst strength of at least 5,000 psi and a tensile strength of at least 325 lbs.

The present system also contemplates a braided hose construction, comprising (a) a polymeric inner tubing: (b) a metal braid disposed about the inner tubing, the metal braid having a plurality of braided wire bundles, each wire bundle formed of a plurality of individual strands, the wire braid having between 18-27 picks per inch with a braid angle between 35°-40°, the individual strands formed of a metal wire having a tensile strength between 140-240 ksi. The metal braid of the braided hose can provide a coverage between approximately 85% to 90% of the inner tubing.

While the foregoing has described what are considered to be exemplary embodiments of the present disclosure, it is understood that various modifications may be made here to hand them the embodiments described herein may be implemented in various forms and numerous other applications, only some of which have been described herein. It is intended that all such modifications and variations be deemed to fall within the true scope of the following claims.

The invention claimed is:

1. A hose fitting assembly for engaging a flexible high-pressure hydraulic hose having a terminal end, the hose fitting assembly comprising:
  (a) an end fitting having an insertion stem concentric with a longitudinal axis, the insertion stem extending along a length of the longitudinal axis, a length of the insertion stem sized to be disposed within the hose, the end fitting having a through bore and external trapping threads extending along a fixed length of the longitudinal axis, the end fitting further including an external stop spaced along the longitudinal axis from the external trapping threads by a non-threaded capturing gap;
  (b) a clamping sleeve having a leading end and a trailing end, the clamping sleeve including a central passageway extending from the leading end to the trailing end, the central passageway sized to receive a length of the hose at the leading end, the central passageway defining a hose stop and internal trapped threads extending along a given length of the longitudinal axis, the central passageway at the trailing end sized to receive the end fitting, the clamping sleeve including (i) external compression threads extending along a predetermined length of the longitudinal axis, (ii) an external fitting stop extending transversely from the longitudinal axis, (iii) a circumferentially compressible section, the external compression threads spaced from the external fitting stop by a free distance, the free distance being non-threaded, and (iv) a locking flange intermediate the external fitting stop and the free distance; and
  (c) a swaging collar having a lead end and a trail end, the swaging collar including a central passage extending between the lead end and the trail end, the central passage having (i) internal compressive threads sized to engage the external compression threads and (ii) a taper, the swaging collar including a clamping section, the central passage sized to receive a portion of the clamping sleeve, the internal compressive threads extending along a set length of the longitudinal axis and spaced from the taper along the longitudinal axis by a non-engaging gap, the non-engaging gap being non-threaded, the lead end configured to abut the external fitting stop in operable engagement of the swaging collar and the clamping sleeve, the swaging collar having a locking groove intermediate the lead end and the internal compressive threads;
  the capturing gap extending a sufficient length along the longitudinal axis to non-threadingly receive all of the internal trapped threads to allow free rotation of the clamping sleeve relative to the end fitting prior to operable engagement of the clamping sleeve and swaging collar;
  wherein the insertion stem is sized to extend along the longitudinal axis to underlie the circumferentially compressible section of the clamping sleeve;
  wherein the clamping sleeve is deformed in response to operable threaded engagement of the clamping sleeve and the swaging collar;
  wherein when the lead end of the swaging collar abuts the external fitting stop, the locking flange engages and seats into the locking groove to resist non-destructive separation of the end fitting from the clamping sleeve; and
  wherein threaded engagement of the internal compressive threads and the external compression threads after the lead end of the swaging collar abuts the external fitting stop imparts a deformation to at least one of the internal compressive threads and the external compression threads to resist non-destructive separation of the swaging collar from the clamping sleeve and preclude reuse.

2. The hose fitting assembly of claim 1, wherein operable engagement of the end fitting, the clamping sleeve and the swaging collar requires less than approximately 15 ft-lbs of torque.

3. The hose fitting assembly of claim 1, wherein operable engagement of the end fitting, the clamping sleeve and the swaging collar requires less than approximately 6 ft-lbs of torque.

4. The hose fitting assembly of claim 1, wherein the end fitting and the clamping sleeve are integral.

5. The hose fitting assembly of claim 1, wherein the end fitting and the clamping sleeve are separate components.

6. The combination of a hose fitting assembly of claim 1 and a hose, the hose comprising a length of flexible high-pressure hydraulic hose, wherein the length of hose includes an inner tubing, a metal braid about the inner tubing and a polymeric outer jacket about the metal braid, wherein the metal braid includes a plurality of metal strands of a less than full tensile strength stainless steel.

7. The hose fitting assembly of claim 6, wherein cooperative engagement of the end fitting, the clamping sleeve and the swaging collar relative to the hose forms the hose fitting assembly for having a burst strength of at least 5,000 psi and a tensile strength of at least 325 lbs.

8. The hose fitting assembly of claim 6, wherein the cooperative engagement of the hose, the end fitting, the clamping sleeve and the swaging collar is configured to meet 49 CFR 571.1 06 for burst strength, tensile strength and whip resistance as set forth in the US Department of Transportation, National Highway Traffic Safety Administration Laboratory Test Procedure for FMVSS 106 Brake Hoses, TP-106-10, Apr. 10, 2008.

* * * * *